(12) United States Patent
Uesugi et al.

(10) Patent No.: US 6,900,250 B2
(45) Date of Patent: May 31, 2005

(54) POLYMERIZABLE COMPOSITION

(75) Inventors: Takahiko Uesugi, Tokyo (JP); Masashi Arishima, Tokyo (JP); Tadao Yagi, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 122 days.

(21) Appl. No.: 10/276,307

(22) PCT Filed: Mar. 12, 2002

(86) PCT No.: PCT/JP02/02303

§ 371 (c)(1),
(2), (4) Date: Nov. 22, 2002

(87) PCT Pub. No.: WO02/072640

PCT Pub. Date: Sep. 19, 2002

(65) Prior Publication Data

US 2003/0212162 A1 Nov. 13, 2003

(30) Foreign Application Priority Data

Mar. 12, 2001 (JP) ......................................... 2001-67938

(51) Int. Cl.$^7$ ............................... C08F 4/00; C08F 2/48
(52) U.S. Cl. ............................. 522/31; 522/15; 522/25; 522/182; 430/281.1
(58) Field of Search ............................. 522/31, 25, 15, 522/182; 430/269–288.1

(56) References Cited

U.S. PATENT DOCUMENTS

| 5,500,453 | A |   | 3/1996 | Toba et al. |
| 5,631,307 | A |   | 5/1997 | Tanaka et al. |
| 5,998,496 | A | * | 12/1999 | Hassoon et al. ............... 522/31 |
| 6,548,220 | B2 | * | 4/2003 | Uetani et al. ............ 430/270.1 |
| 2002/0015913 | A1 | * | 2/2002 | Uetani et al. ............ 430/270.1 |

FOREIGN PATENT DOCUMENTS

| GB | 1526923 | 10/1978 |
| JP | 5-255347 | 10/1993 |
| JP | 6-157623 | 6/1994 |
| WO | 97/16406 | 5/1997 |

OTHER PUBLICATIONS

"Photopolymerization initiator" Kanko Zaivyo List Book Published by Bunshin Shuppan.
S. Hassoon et al.: "Photochemistry of (benzophenonylmethyl)–tri–n–butylammonium triphenylbutylborate: inter– and intra–ion–pair electron transfer photoreduction" J. Am. Chem. Soc., vol. 117, pp. 11369–11370 1995.
Ananda M. Sarker et al.: "Synthesis and characterization of a novel polymeric system bearing a benzophenone borate salt as a new photoinitiator for uv curing" MACROMOLECULES, vol. 29, pp. 8047–8052 1996.
Roman Popielarz et al.: "Applicability of tetraphenylborate salts as free radical initiators" MACROMOLECULES, vol. 31, no. 4, pp. 951–954 Feb. 24, 1998.

Oleg Grinevich et al. "Relative activity of possible initiating species produced from photolysis of tetraphenyl and triphenylbutyl borates as measured by fluorescence probe techniques" MACROMOLECULES, vol. 32, pp. 328–330 1999.
Wenqin Zhang et al.: "Photochemical properties of 4–benzoylbenzylammonium borates" J. Org. Chem., vol. 64, pp. 458–463 1999.
Shengkui Hu e al.: "Reactivities of chromophore–containing methyl tri–n–butylammonium organoborate salts as free radical photoinitiators: dependence on the chromophore and borate counterion" MACROMOLECULES, vol. 31, pp. 6476–6480 1998.
Yasumasa Toba et al.: "The onium butyltriphenylborates as novel donor–acceptor initiators for free radical photopolymerization" Chem. Commun., pp. 675–676 1997.
Yasumasa Toba et al.: "Onium butyltriphenylborates as donor–acceptor initiators for sensitized photopolymerizations of vinyl monomer" MACROMOLECULES, vol. 31, pp. 6022–6029 1998.
Yasumasa Toba et al.: "Visible laser polymerizations with the sulfonium borate styryl dyes as new photoinitiator systems" Journal of Photoscience, vol. 5, no. 2, pp. 63–67 1998.
Yasumasa Toba et al.: "Visible light polymerization of acrylate using dialkylphenacylsulfonium butyltriphenylborate inhibitors: effect of the reduction potential of the sulfonium cation on the polymerization" MACROMOLECULES, vol. 32, pp. 6545–6551 1999.
Yasumasa Toba et al.: "Photopolymerization of an acrylate in a PMMA film using the aromatic ketone–sulfonium borate photoinitiator systems" Journal of Photopolymer Science and Technology, vol. 12, no. 1, pp. 115–120, 1999.

* cited by examiner

Primary Examiner—Susan Berman
(74) Attorney, Agent, or Firm—Oblon, Spivak, McClelland, Maier & Neustadt, P.C.

(57) ABSTRACT

A polymerizable composition comprising a polymerization initiator (A) represented by the formula (1) and a radical-polymerizable compound (B):

Formula (1)

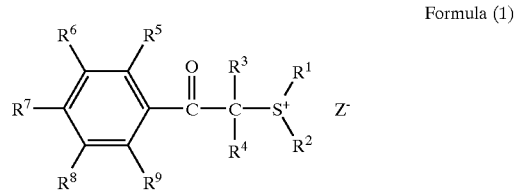

(wherein $R^5$, $R^6$, $R^7$, $R^8$ and $R^9$ are each independently a hydrogen atom, an alkyl, alkoxyl, hydroxyl or acyloxy group, a halogen atom, or —$NR^{10}R^{11}$, but at least one of them is —$NR^{10}R^{11}$; wherein $R^1$, $R^2$, $R^3$, $R^4$, $R^{10}$ and $R^{11}$ are each independently a hydrogen atom, or an alkyl or aryl group; and $Z^-$ is an arbitrary anion).

4 Claims, 3 Drawing Sheets

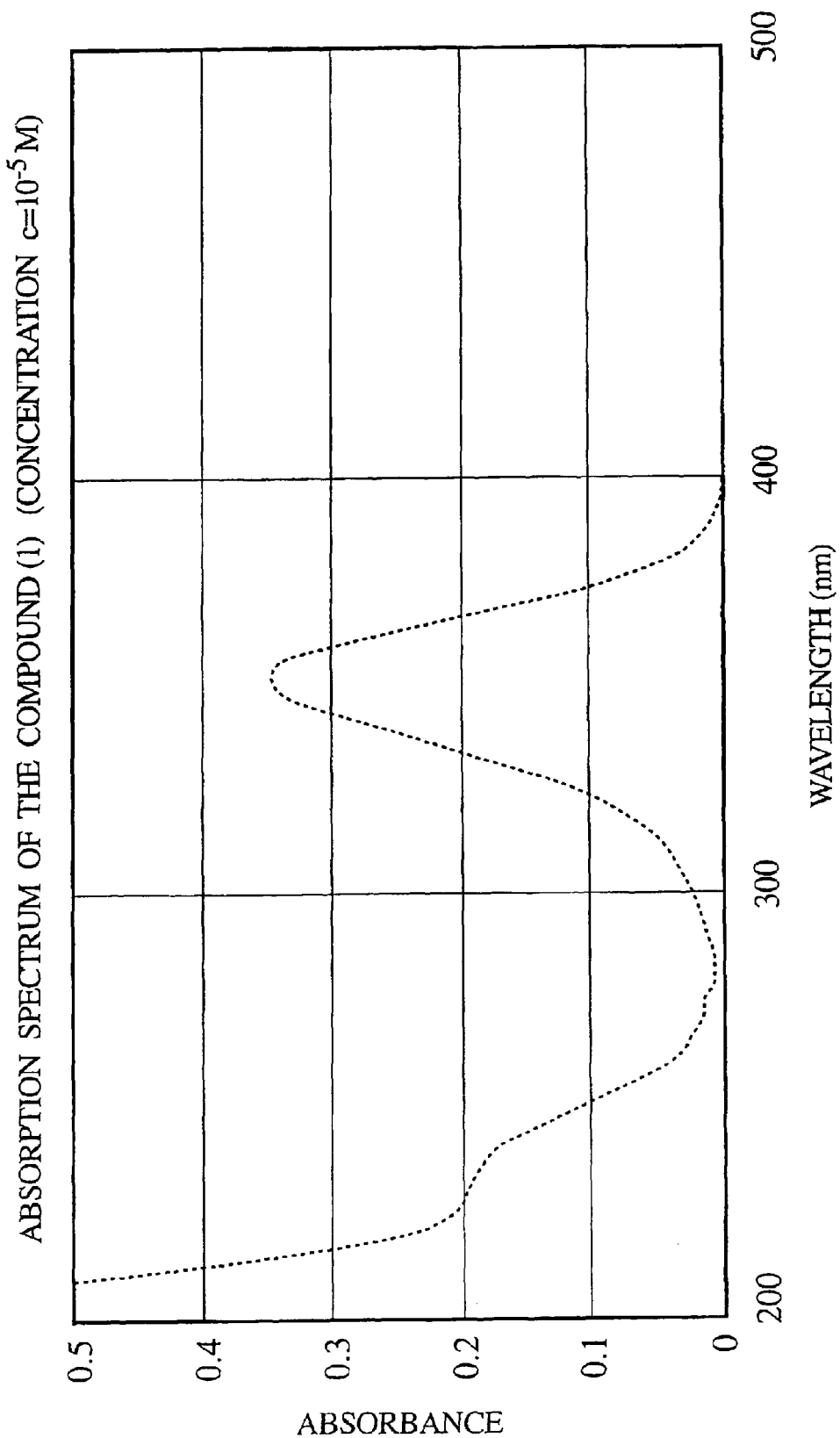

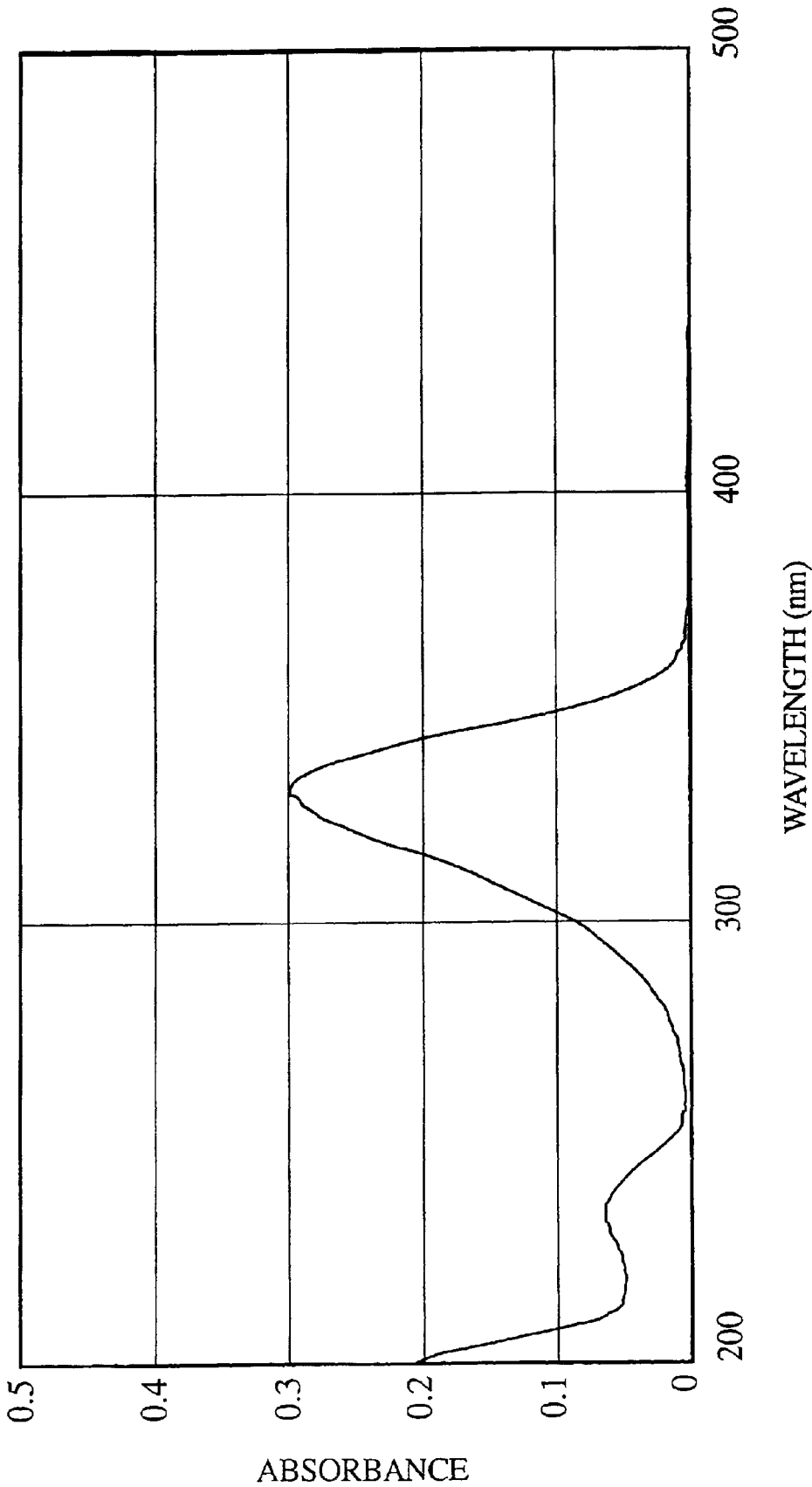

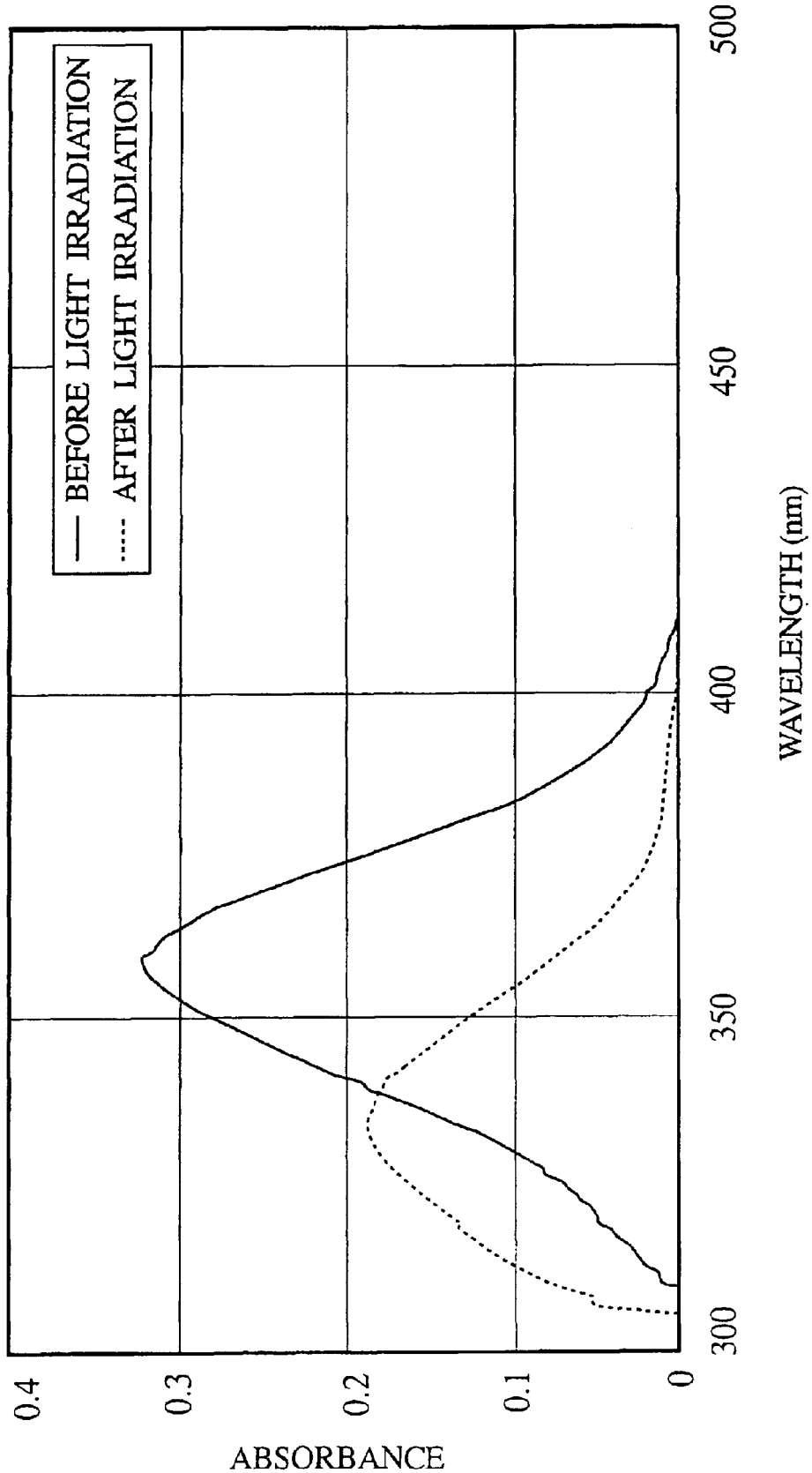

ically, it relates to a polymerizable composition capable of obtaining a polymer or a cured substance having good physical properties when irradiated with energy rays, particularly ultraviolet rays to generate free radicals and to thereby cure a radical-polymerizable compound in a short time. The radical polymerizable compounds are used in various fields of molded resins, cast resins, resins for optical shaping, sealants, polymer resins for dental purposes, printing inks, paints, photosensitive resins for printing plates, color proofs for printing, resists for color filters, dry film resists, resists for printed substrates, photoresists for semiconductors, resists for microelectronics, hologram materials, overcoat materials, adhesives, tack agents, mold releasing agents, optical recording media, a variety of devices and the like.

POLYMERIZABLE COMPOSITION

TECHNICAL FIELD

The present invention relates to a polymerizable composition, and more particularly, it relates to a polymer-

BACKGROUND ART

Photo-polymerization initiators, which trigger polymerization of an acrylate or the like when irradiated with ultraviolet rays, are widely used. Commercial photo-polymerization initiators are described by, e.g., "Kankou Zairyou List Book," pp. 55 to 72, 1996, edited by The Technical Association of Photopolymers, Japan, published by Bunshin Shuppan.

Recently, research has been extensively carried out to develop photopolymerization initiators having higher sensitivity than commercial initiators. One of these initiators proposed so far has, in the molecule, a section which absorbs light and another section which generates free radicals. The structure of this initiator is based on a concept that the two sections are allowed to exist in the same molecule, whereby there easily occurs a light-induced electron transfer reaction or a light energy transfer reaction between the two sections, thereby enhancing an efficiency in generating free radicals.

For example, many researchers have discussed photopolymerization initiators comprising an ammonium cation and borate anion, the above ammonium cation having a benzophenone structure, coumarin structure or naphthalene structure as the light-absorbing section [PCT WO97/16406; Journal of American Chemical Society, Vol. 117, pp. 11369 to 11370 (published by American Chemical Society in 1995); Macromolecules, Vol. 29, pp. 8047 to 8052 (published by American Chemical Society in 1996); Macromolecules, Vol. 31, pp. 951 to 954 (published by American Chemical Society in 1998); Macromolecules, Vol. 32, pp. 328 to 330 (published by American Chemical Society in 1999); and Journal of Organic Chemistry, Vol. 64, pp. 458 to 463 (published by American Chemical Society in 1999)].

Moreover, the relationship between electron accepting ability and photolysis efficiency in the cation section of these onium ion type radical polymerization initiators has also been researched, and onium salts having a variety of substituents have been reported. For example, an ammonium borate having a benzothienyl group or benzofuryl group in the molecule is reported in Macromolecules, Vol. 31, pp. 6476 to 6480 (published by American Chemical Society in 1998). This polymerization initiator has absorption at 365 nm, and may act as a polymerization initiator incorporated with a photo-sensitizing section, when irradiated with ultraviolet rays of the same wavelength.

Furthermore, it has been suggested another type of high-sensitivity photopolymerization initiators that has two or more free-radical generating sections in the molecule. Examples of this type include sulfonium borate complexes mentioned in Japanese Patent Laid-open Publication No. 5-218361, Japanese Patent Laid-open Publication No. 5-255347, Japanese Patent Laid-open Publication No. 5-255421, Japanese Patent Laid-open Publication No. 6-157623, Journal of Chemical Society, Chemical Communication, pp. 675 to 676 (published by Royal Society of Chemistry in 1997), Macromolecules, Vol. 31, pp. 6022 to 6029 (published by American Chemical Society in 1998), Journal of Photoscience, Vol. 5, pp. 63 to 67 (published by Korean Society of Photoscience), Macromolecules, Vol. 32, pp. 6545 to 6551 (published by American Chemical Society in 1999), and Journal of Photopolymer Science and Technology, Vol. 12, pp. 115 to 120 (published by Technical association of Photopolymers, Japan in 1999). It has been reported that these initiators show high sensitivity, when irradiated with light, by generating free radicals from both the sulfonium cation and borate anion in the presence of a sensitizer such as Michler's ketone, thioxanthone or keto-coumarin.

Recently, from the viewpoints of productivity improvement and cost reduction, there are generally demanded materials which can be cured at a smaller dose or with a smaller quantity of light energy than a polymerizable composition incorporated with a known conventional polymerization initiator or additive, i.e., more sensitive materials.

Characteristics regarding colors are frequently controlled very strictly in these fields. For example, a color filter resist may suffer deadly deterioration of quality because of an inability to reproduce a target color when colored or discolored by a component other than pigment or dye. More specifically, a blue color filter resist will greatly lose color purity when a component added thereto is discolored yellow, thereby noticeably narrowing a color region reproducible by a liquid crystal display. Demands for a color reproducible region have been increasing particularly in recent years, with the spread of liquid crystal displays.

A variety of irradiation wavelengths have been used in fields in which photo-curing techniques are applied, and most frequently used irradiation wavelengths of ultraviolet rays are 365 and 405 nm. In addition, continuous wavelengths in a range of 340 to 420 nm of a metal halide lamp are also often used. For the polymerizable composition to exhibit high polymerization sensitivity with irradiation by ultraviolet rays of the above wavelength, it is necessary to contain a photopolymerization initiator or sensitizer which exhibits an adequate absorption of the rays. However, many known materials having an adequate absorption of ultraviolet rays at the above wavelength also have an absorption of about 400 nm or a longer wavelength, and so they are colored yellow. On the other hand, materials which are not so colored lack adequate absorption of ultraviolet rays of the above wavelength, and hence they often have insufficient polymerization sensitivity. In order to improve sensitivity by the use of such a material lacking the adequate absorption for the polymerizable composition, it is necessary to increase a quantity of the polymerization initiator or sensitizer to be added. This frequently colors the material in consequence, or leads to the deterioration of film characteristics in the presence of a large quantity of the low molecular weight compound.

Conventional known sulfonium ion type photopolymerization initiators lack absorption of an irradiation wavelength of 365 or 405 nm emitted from a mercury lamp, or a wavelength range of 340 to 420 nm of continuous light emitted from a metal halide lamp. Therefore, these initiators required the complicated task of selecting an optimum sensitizer from a number of sensitizers and determining its optimum content before it is actually used. Moreover, known sensitizers such as Michler's ketone, thioxanthone and ketocoumarin, are frequently colored. They are partly decomposed when irradiated with light, but will not completely be decolored. In consequence, the polymerized composition incorporated with the above sensitizer will invariably be colored, and hence, it is unsuitable for applications which are strictly controlled regarding color-related characteristics typified by color filters described above.

An ammonium borate having a benzophenone structure, coumarin structure or naphthalene structure, or a naphthyl group, benzothienyl group or benzofuryl group in its molecule is not so colored. They have absorption of a wavelength around 365 nm even in the absence of the sensitizer, and can function as the photopolymerization initiator. However, they absorb a wavelength of 365 nm very weakly. Under current situations which demand highly sensitive polymerizable compositions capable of curing materials in a shorter time and with a smaller quantity of irradiation light to reduce cost or improve productivity, their practical sensitivity is insufficient for the increased cost resulting from the incorporation of an expensive borate structure.

A highly sensitive polymerizable composition capable of satisfying all of the requirements described above is not known so far. Therefore, demand is increasing for polymerizable compositions which exhibit, even in the absence of the sensitizer, the high sensitivity for irradiation light of a wavelength in an ultraviolet ray range, particularly irradiation light having a wavelength of 365 or 405 nm emitted from a mercury lamp or an irradiation light range of 340 to 420 nm emitted from a metal halide lamp and which are colored only to a limited extent.

DISCLOSURE OF THE INVENTION

The inventors of the present invention have achieved the present invention after having extensively studied to solve the above problems.

The present invention is directed to an ultraviolet-polymerizable composition, comprising a polymerization initiator (A) and a radical-polymerizable compound (B), wherein the initiator (A) is capable of directly absorbing ultraviolet rays to substantially initiate the polymerization and is represented by the formula (1).

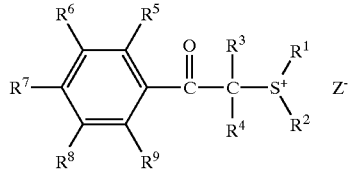

Formula (1)

(wherein $R^5$, $R^6$, $R^7$, $R^8$ and $R^9$ are each independently a hydrogen atom, an alkyl, alkoxyl, hydroxyl or acyloxy group, a halogen atom, or —$NR^{10}R^{11}$, but at least one of them is —$NR^{10}R^{11}$; wherein $R^1$, $R^2$, $R^3$, $R^4$, $R^{10}$ and $R^{11}$ are each independently a hydrogen atom, an alkyl or aryl group; and $Z^-$ is an arbitrary anion).

The arbitrary anion $Z^-$ may be a borate represented by the formula (2):

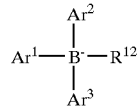

Formula (2)

(wherein $Ar^1$, $Ar^2$ and $Ar^3$ are each an aryl group which may have a substituent of 6 to 10 carbon atoms; and $R^{12}$ is an aryl group which may have a substituent of 6 to 10 carbon atoms, or a primary alkyl group of 1 to 8 carbon atoms).

The present invention also includes a polymer produced by polymerization of the polymerizable composition with the aid of ultraviolet rays.

Moreover, the present invention includes a process of producing a polymer, comprising the step of polymerizing the polymerizable composition with the aid of ultraviolet rays.

The present disclosure relates to subject matter contained in Japanese Patent Application No. 2001-067968, filed on Mar. 12, 2001, the disclosure of which is expressly incorporated herein by reference in its entirety.

BRIEF DESCRIPTION OF THE DRAWINGS

FIG. 1 is an absorption spectrum of a compound (1).

FIG. 2 is an absorption spectrum of a compound (2).

FIG. 3 is an absorption spectrum of a polymerizable composition film prepared in EXAMPLE 1.

BEST MODE FOR CARRYING OUT THE INVENTION

The present invention will be described below in detail.

First, a polymerization initiator (A) for the present invention will be described. It has a structure represented by the formula (1), and is characterized by containing a sulfonium cation having a phenacyl group in which a hydrogen atom on a benzene ring is substituted with an amino group. In the initiator (A), the phenacyl group in which the hydrogen atom on the benzene ring is substituted with the amino group is directly bonded to the sulfonium, whereby the initiator (A) has a large absorption maximum in a range of about 300 nm to about 400 nm. Therefore, it has adequate absorption at 365 nm, which is the most extensively used irradiation wavelength in the ultraviolet range, and at 405 nm depending on its structure. As a result, it is considered that the sulfonium cation structure itself can function as a sensitizer and a free radical generating section, and hence, as a very sensitive self-sensitizing type polymerization initiator.

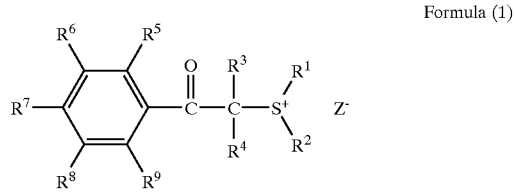

Formula (1)

(wherein $R^5$, $R^6$, $R^7$, $R^8$ and $R^9$ are each independently a hydrogen atom, an alkyl, alkoxyl, hydroxyl or acyloxy group, a halogen atom, or —$NR^{10}R^{11}$, but at least one of them is —$NR^{10}R^{11}$; $R^1$, $R^2$, $R^3$, $R^4$, $R^{10}$ and $R^{11}$ are each independently a hydrogen atom, or an alkyl or aryl group; and $Z^-$ is an arbitrary anion).

For example, a compound (1) as the polymerization initiator (A) has an absorption maximum of $\epsilon=34,800$ at a wavelength of 353 nm in acetonitrile, and also has a large absorption of $\epsilon=23,000$ at 365 nm. As a result, it can absorb light very efficiently. FIG. 1 shows an absorption spectrum of the compound (1) in acetonitrile.

Compound (1)

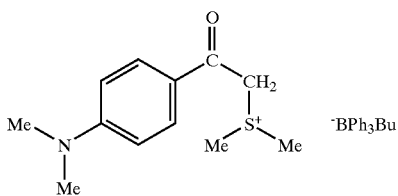

The polymerization initiator (A) generates radicals, when irradiated with light in an ultraviolet range, conceivably because of the highly selective and efficient cleavage of a bond between a sulfur atom S and carbon atom $C^2$ in a structure represented by the formula (3). The generated radicals attack the radical-polymerizable composition (B) to polymerize and cure the composition.

Formula (3)

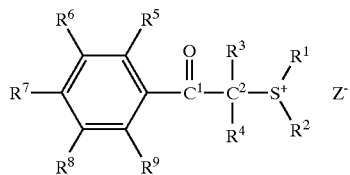

(wherein $R^5$, $R^6$, $R^7$, $R^8$ and $R^9$ are each independently a hydrogen atom, an alkyl, alkoxyl, hydroxyl or acyloxy group, a halogen atom, or —$NR^{10}R^{11}$, but at least one of them is —$NR^{10}R^{11}$; wherein $R^1$, $R^2$, $R^3$ $R^4$, $R^{10}$ and $R^{11}$ are each independently a hydrogen atom, or an alkyl or aryl group; and $Z^-$ is an arbitrary anion).

It is considered that photolysis of the polymerization initiator (A) gives a product represented by the formula (4) in the polymerizable composition. A substituent X in the formula (4) varies depending on a combination of materials used for the polymerizable composition of the present invention, but in many cases, it is a hydrogen atom or a high molecular weight chain formed by the radical-polymerizable,compound (B). The absorption maximum at about 300 to 400 nm of the compound represented by the formula (4) is generally observed on several tens nm shorter than the absorption maximum of the polymerization initiator (A). Therefore, when the polymerization initiator (A) is irradiated with light in the ultraviolet range to generate radicals, the absorption wavelength of the polymerizable composition of the present invention shifts to the shorter wavelength side. For example, compounds having a preferable absorption at 365 or 405 nm, which is a bright line of light from a mercury lamp, frequently assume a yellow color. The polymerization initiator (A) for the present invention may have yellow color in some cases, but can remarkably decrease a coloring extent up to an almost colorless condition, after being irradiated with light.

Formula (4)

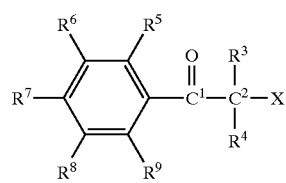

(wherein X is a hydrogen atom or a high-molecular weight chain produced by polymerization of the radical-polymerizable compound (B)).

FIG. 2 shows an absorption spectrum of a compound (2) in acetonitrile, which is an example of the compound produced by the photolysis of the compound (1). The compound (2) has an absorption maximum of $\epsilon=30,100$ at a wavelength of 330 nm. Accordingly, its spectrum greatly shifts as a whole to a shorter wavelength side as compared with the compound (1).

Compound (2)

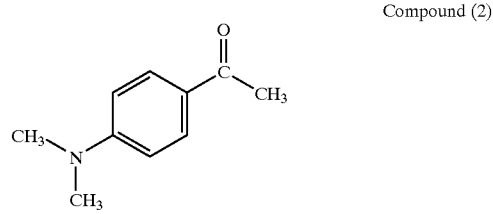

The absorption at 353 nm which is the absorption maximum of the compound (1) greatly diminishes in the compound (2), which is considered to be produced after light irradiation, and instead its transmittance increases. Therefore, the polymerizable composition of the present invention also has an efficient function of decreasing a color, and hence it can be suitably used for a system incorporating a high content of the polymerization initiator (A) or a system of thick film, where use of the composition of low transmittance is considered to be disadvantageous.

Next, the substituents $R^1$, $R^2$, $R^3$ and $R^4$ in the formula (1) will be described. They are each a substituent selected from the group consisting of a hydrogen atom, an alkyl and an aryl group. The polymerization initiator (A) can be adjusted for its solubility and thermal stability by properly selecting these substituents.

Examples of the above-mentioned alkyl groups include, but are not limited to, straight-chain, branched and alicyclic alkyl groups, e.g., methyl, ethyl, propyl, isopropyl, butyl, isobutyl, pentyl, isopentyl, neopentyl, hexyl, octyl, decyl, dodecyl and cyclohexyl.

Examples of the above-mentioned aryl groups include, but are not limited to, phenyl, o-tolyl, m-tolyl, p-tolyl, 2,3-xylyl, 2,5-xylyl, 1-naphthyl and 2-naphthyl.

These alkyl and aryl groups may be substituted by another substituent. Examples of the substituted alkyl groups include chloromethyl, hydroxymethyl, methoxymethyl, cyanomethyl, 2-hydroxyethyl, allyl, benzyl and phenacyl. Examples of the substituted aryl groups include o-chlorophenyl, m-fluorophenyl, p-cyanophenyl and p-hydroxyphenyl. They fall into the category of the alkyl or aryl group represented by $R^1$, $R^2$, $R^3$ or $R^4$ in the formula (1). Of these, the preferable alkyl or aryl groups represented by $R^1$ or $R^2$ are methyl, ethyl, propyl, isopropyl, butyl, isobutyl, dodecyl, or phenyl, o-tolyl, m-tolyl, p-tolyl, 2-hydroxyethyl, allyl, benzyl and phenacyl.

Each of the substituents $R^1$, $R^2$, $R^3$ and $R^4$ is independently selected. When an alkyl group is used as the substituent $R^1$ and $R^2$, they may be bonded to each other through the covalent bond to form a cyclic structure. These structures include, but are not limited to, tetrahydrothiophene and thiomorpholine structure.

Next, the substituents $R^5$, $R^6$, $R^7$, $R^8$ and $R^9$ are described. At least one of them should be an amino group represented by —$NR^{10}R^{11}$. These substituents other than amino group are each independently a hydrogen atom, an alkyl, alkoxyl, hydroxyl or acyloxy group, or a halogen atom. The polymerization initiator (A) can be adjusted for its absorption wavelength and solubility by carefully selecting these substituents.

Examples of the above-mentioned halogen atoms include fluorine, chlorine, bromine and iodine.

Examples of the above-mentioned alkyl groups include, but are not limited to, methyl, ethyl, propyl, isopropyl, butyl, isobutyl, sec-butyl, pentyl, isopentyl, neopentyl, hexyl, octyl, decyl, dodecyl and cyclohexyl. These alkyl groups may be substituted by another substituent. Examples of the substituted alkyl groups include chloromethyl, hydroxymethyl and hydroxyethyl. They fall into the category of the alkyl group represented by the substituents $R^5$, $R^6$, $R^7$, $R^8$ and $R^9$ other than amino group. Of these, the particularly preferable alkyl groups are methyl, ethyl and isopropyl.

Examples of the above-mentioned alkoxyl groups include, but are not limited to, methoxy, ethoxy, propoxy, isopropoxy, butoxy, isobutoxy, tert-butoxy, hexyloxy and oxyloxy.

Examples of the above-mentioned acyloxy groups include, but are not limited to, acetoxy, ethanoyloxy, heptanoyloxy and benzoyloxy.

The substituents for the substituents $R^5$, $R^6$, $R^7$, $R^8$ and $R^9$ are not necessarily the same, and any combination of the above-described substituents may be used. Two or more of these substituents may be bonded to each other to form a cyclic structure. Each of the substituents $R^5$ and $R^9$ may be bonded to $R^1$, $R^2$ or sulfur atom to form a cyclic structure. These cyclic structures include, but are not limited to, 3-oxodihydrobenzothiophene and isothiochromanone structure. At least one of $R^5$, $R^6$, $R^7$, $R^8$ and $R^9$ are represented by $-NR^{10}R^{11}$, and preferably only one of them is represented by $-NR^{10}R^{11}$ for securing the most adequate characteristics related to light absorption.

Next, the substituents $R^{10}$ and $R^{11}$ in $-NR^{10}R^{11}$ are described. The substituents $R^{10}$ and $R^{11}$ in $-NR^{10}R^{11}$ are each a hydrogen atom, or an alkyl or aryl group.

Examples of the above-mentioned alkyl groups include, but are not limited to, straight-chain, branched and alicyclic alkyl groups, e.g., methyl, ethyl, propyl, isopropyl, butyl, isobutyl, pentyl, isopentyl, neopentyl, hexyl, octyl, decyl, dodecyl and cyclohexyl.

Examples of the above-mentioned aryl groups include, but are not limited to, phenyl, o-tolyl, m-tolyl, p-tolyl, 2,3-xylyl, 2,5-xylyl, 1-naphthyl and 2-naphthyl.

These alkyl and aryl groups may be substituted by another substituent. Examples of the substituted alkyl groups include chloromethyl, hydroxymethyl, methoxymethyl, cyanomethyl, 2-hydroxyethyl, allyl, benzyl and phenacyl. Examples of the substituted aryl groups include o-chlorophenyl, m-fluorophenyl, p-cyanophenyl and p-hydroxyphenyl. They fall into the category of the alkyl or aryl group represented by $R^{10}$ and $R^{11}$ for $-NR^{10}R^{11}$. Of these, the preferable alkyl groups for $R^{10}$ and $R^{11}$ are methyl, ethyl, propyl, isopropyl, butyl, isobutyl, benzyl and phenacyl for their good light-absorbing characteristics and solubility.

The substituents $R^{10}$ and $R^{11}$ are not necessarily the same, and any combination of a hydrogen atom and the above-described substituents may be used. However, each of $R^{10}$ and $R^{11}$ is particularly preferably an alkyl group, because this combination secures good sensitivity.

When each of the substituents $R^{10}$ and $R^{11}$ for $-NR^{10}R^{11}$ is a substituent other than a hydrogen atom, they may be bonded to each other to form a cyclic structure through a covalent bond. The cyclic structure, when formed by these substituents, may contain a hetero atom, e.g., oxygen, sulfur or nitrogen, as the constituent. These amino groups include, but are not limited to, morpholino and thiomorpholino.

Next, an anion $Z^-$ in the formula (1) will be described. Examples of the anion $Z^-$ in the formula (1) include nucleophilic anions, e.g., $Cl^-$, $Br^-$, $HSO_3^-$, $NO_3^-$, $CH_3COO^-$ and $CH_3SO_3^-$. Alkyl benzene sulfonate ions, represented by p-toluenesulfonate and p-dodecylbenzenesulfonate ion, are also useful as the anion $Z^-$. Non-nucleophilic anions, e.g., $BF_4^-$, $PF_6^-$, $SbF_6^-$, $ClO_4^-$, $CF_3SO_3^-$ and $CF_3(CF_2)_3SO_3^-$, are also useful as the anion $Z^-$. A borate anion substituted by an alkyl or aryl group also falls into the category of the anion $Z^-$ for the present invention. When the polymerizable composition of the present invention is lipophilic, it is preferable to use the polymerization initiator (A) having the non-nucleophilic anion described above, although it is not limited thereto.

The borate anion represented by the formula (2), when used as the anion $Z^-$ in the formula (1), gives still higher sensitivity, because not only the sulfonium cation section but also the borate anion is decomposed to generate free radicals.

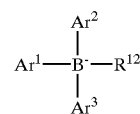

Formula (2)

(wherein $Ar^1$, $Ar^2$ and $Ar^3$ are each an aryl group which may have a substituent of 6 to 10 carbon atoms; and $R^{12}$ is an aryl group which may have a substituent of 6 to 10 carbon atoms, or a primary alkyl group of 1 to 8 carbon atoms).

Examples of the aryl groups which may have a substituent of 6 to 10 carbon atoms include phenyl, o-tolyl, m-tolyl, p-tolyl, 2,3-xylyl, 2,5-xylyl, 1-naphthyl and 2-naphthyl, and substituted aryl groups, e.g., o-chlorophenyl, m-fluorophenyl, p-cyanophenyl and p-methoxyphenyl.

Examples of the above-mentioned aryl groups of $R^{12}$ which may have a substituent of 6 to 10 carbon atoms include aryl groups represented by the substituents $Ar^1$, $Ar^2$ and $Ar^3$ which may have a substituent of 6 to 10 carbon atoms, where $Ar^1$, $Ar^2$ or $Ar^3$ may not necessarily be the same as $R^{12}$.

The primary alkyl group of 1 to 8 carbon atoms may be selected from methyl, ethyl, propyl, isopropyl, butyl, isobutyl, pentyl, isopentyl, hexyl and octyl, among others. For the combination of the substituents in the formula (2), the primary alkyl group of 1 to 8 carbon atoms is more sensitive and hence more preferable than the aryl groups which may have a substituent of 6 to 10 carbon atoms. The polymerization initiator (A) can be adjusted for its crystallinity and sensitivity carefully selecting these substituents.

The particularly preferable examples of the polymerization initiator (A) for the present invention include, in addition to the compound (1) described above, compounds (3) to (25) described below, wherein "Me" is a methyl group, "Et" is an ethyl group, "Bu" is a butyl group, "Hex" is a hexyl group, and "Ph" is a phenyl group.

Compound (3)

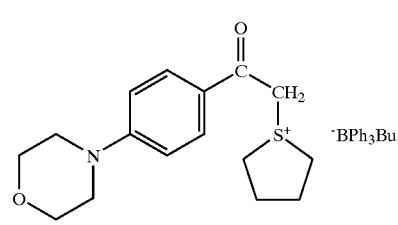

-continued

Compound (4)

Compound (5)

Compound (6)

Compound (7)

Compound (8)

Compound (9)

Compound (10)

Compound (11)

Compound (12)

Compound (13)

Compound (14)

Compound (15)

Compound (16)

Compound (17)

Compound (18)
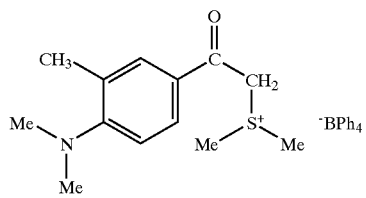

Compound (19)
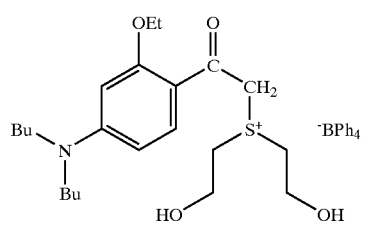

Compound (20)
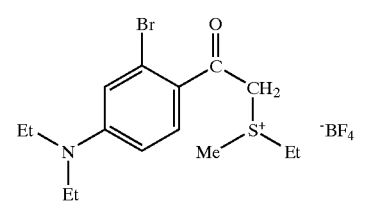

Compound (21)
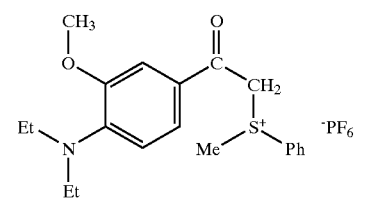

Compound (22)
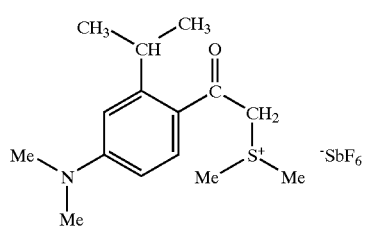

Compound (23)
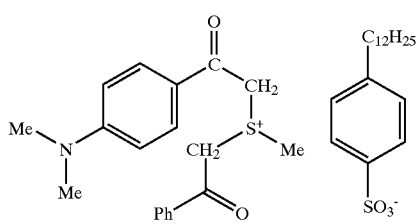

Compound (24)
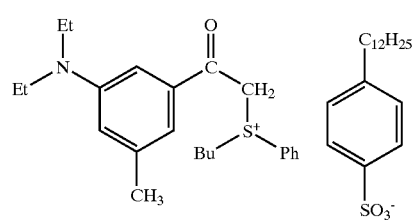

Compound (25)
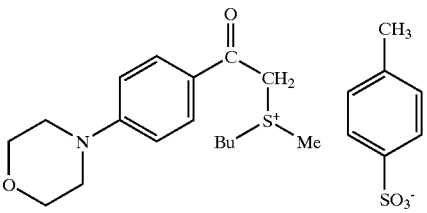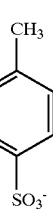

Next, a radical-polymerizable compound (B) for the present invention will be described. It is a compound which has at least one radical-polymerizable structure in the molecule. The compounds are monomer, or oligomer or polymer in solid or liquid phase under normal temperature and pressure.

Examples of the radical-polymerizable compound (B) include, but are not limited to, unsaturated carboxylic acids and their salts, their esters, their urethane, their amides and their acid anhydrides, e.g., acrylic, methacrylic, itaconic, crotonic, isocrotonic and maleic acid, and furthermore acrylonitrile, styrene derivatives, a variety of unsaturated compounds, e.g., unsaturated polyesters, polyethers, polyamides and polyurethanes. The specific examples of the radical-polymerizable compound (B) are listed up below:

Acrylates

Mono-functional alkyl acrylates, e.g. methyl acrylate, ethyl acrylate, propyl acrylate, isopropyl acrylate, butyl acrylate, isoamyl acrylate, hexyl acrylate, 2-ethylhexyl acrylate, octyl acrylate, decyl acrylate, lauryl acrylate, stearyl acrylate, isobornyl acrylate, cyclohexyl acrylate, dicyclopentenyl acrylate, dicyclopentenyloxyethyl acrylate and benzyl acrylate;

Mono-functional hydroxyl-containing acrylates, e.g. 2-hydroxyethyl acrylate, 2-hydroxypropyl acrylate, 2-hydroxy-3-chloropropyl acrylate, 2-hydroxy-3-phenoxypropyl acrylate, 2-hydroxy-3-allyloxypropyl acrylate and 2-acryloyloxyethyl-2-hydroxypropyl phthalate;

Mono-functional halogen-containing acrylates, e.g., 2,2,2-trifluoroethyl acrylate, 2,2,3,3-tetrafluoropropyl acrylate, 1H-hexafluoroisopropyl acrylate, 1H,1H,5H-octafluoropentyl acrylate, 1H,1H,2H,2H-heptadecafluorodecyl acrylate, 2,6-dibromo-4-butylphenyl acrylate, 2,4,6-tribromophenoxyethyl acrylate and 2,4,6-tribromophenol 3EO-added acrylate;

Mono-functional ether-containing acrylates, e.g., 2-methoxyethyl acrylate, 1,3-butylene glycol methyl ether acrylate, butoxyethyl acrylate, methoxytriethylene glycol acrylate, methoxypolyethylene glycol #400 acrylate, methoxydipropylene glycol acrylate, methoxytripropylene glycol acrylate, methoxypolypropylene glycol acrylate, ethoxydiethylene glycol acrylate, 2-ethylhexyl carbitol acrylate, tetrahydrofurfuryl acrylate, phenoxyethyl acrylate, phenoxydiethylene glycol acrylate, phenoxypolyethylene glycol acrylate, cresyl polyethylene glycol acrylate, p-nonylphenoxyethyl acrylate, p-nonylphenoxypolyethylene glycol acrylate and glycidyl acrylate;

Mono-functional carboxyl-containing acrylates, e.g., β-carboxyethyl acrylate, succinic acid monoacryloyloxyethyl ester, ω-carboxypolycaprolactone monoacrylate, 2-acryloyloxyethyl hydrogen phthalate, 2-acryloyloxypropyl hydrogen phthalate, 2-acryloyloxypropyl hexahydrohydrogen phthalate and 2-acryloyloxypropyl tetrahydrohydrogen phthalate;

Other mono-functional acrylates, e.g., N,N-dimethylaminoethyl acrylate, N,N-dimethylaminopropyl acrylate, morpholinoethyl acrylate, trimethylsiloxyethyl acrylate, diphenyl-2-acryloyloxyethyl phosphate, 2-acryloyloxyethyl acid phosphate and caprolactone-modified-2-acryloyloxyethyl acid phosphate;

Bi-functional acrylates, e.g., 1,4-butanediol diacrylate, 1,6-hexanediol diacrylate, diethylene glycol diacrylate, triethylene glycol diacrylate, tetraethylene glycol diacrylate, polyethylene glycol #200 diacrylate, polyethylene glycol #300 diacrylate, polyethylene glycol #400 diacrylate, polyethylene glycol #600 diacrylate, dipropylene glycol diacrylate, tripropylene glycol diacrylate, tetrapropylene glycol diacrylate, polypropylene glycol #400 diacrylate, polypropylene glycol #700 diacrylate, neopentyl glycol diacrylate, neopentyl glycol PO-modified diacrylate, hydroxypivalic acid/neopentyl glycol ester diacrylate, caprolactone-added diacrylate of hydroxypivalic acid/neopentyl glycol ester, 1,6-hexanediolbis(2-hydroxy-3-acryloyloxypropyl)ether, 1,9-nonanediol diacrylate, pentaerythritol diacrylate, pentaerythritol diacrylate monostearate, pentaerythritol diacrylate monobenzoate, bisphenol A diacrylate, EO-modified bisphenol A diacrylate, PO-modified bisphenol A diacrylate, hydrogenated bisphenol A diacrylate, EO-modified hydrogenated bisphenol A diacrylate, PO-modified hydrogenated bisphenol A diacrylate, bisphenol F diacrylate, EO-modified bisphenol F diacrylate, PO-modified bisphenol F diacrylate, EO-modified tetrabromobisphenol A diacrylate, tricyclodecane dimethylol diacrylate and isocyanuric acid EO-modified diacrylate;

Tri-functional acrylates, e.g., glycerin PO-modified triacrylate, trimethylolpropane triacrylate, trimethylolpropane EO-modified triacrylate, trimethylolpropane PO-modified triacrylate, isocyanuric acid EO-modified triacrylate, isocyanuric acid EO-modified, ε-caprolactone-modified triacrylate, 1,3,5-triacryloylhexahydro-s-triazine, pentaerythritol triacrylate and dipentaerythritol triacrylate tripropionate;

Tetra- or more functional acrylates, e.g., pentaerythritol tetraacrylate, dipentaerythritol pentaacrylate monopropionate, dipentaerythritol hexaacrylate, tetramethylolmethane tetraacrylate, oligoester tetraacrylate and tris(acryloyloxy)phosphate, Methacrylates Mono-functional alkyl methacrylates, e.g., methyl methacrylate, ethyl methacrylate, propyl methacrylate, isopropyl methacrylate, butyl methacrylate, isoamyl methacrylate, hexyl methacrylate, 2-ethylhexyl methacrylate, octyl methacrylate, decyl methacrylate, lauryl methacrylate, stearyl methacrylate, isobornyl methacrylate, cyclohexyl methacrylate, dicyclopentenyl methacrylate, dicyclopentenyloxyethyl methacrylate and benzyl methacrylate;

Mono-functional hydroxyl-containing methacrylates, e.g., 2-hydroxyethyl methacrylate, 2-hydroxypropyl methacrylate, 2-hydroxy-3-chloropropyl methacrylate, 2-hydroxy-3-phenoxypropyl methacrylate, 2-hydroxy-3-allyloxypropyl methacrylate and 2-methacryloyloxyethyl-2-hydroxypropyl phthalate;

Mono-functional halogen-containing methacrylates, e.g., 2,2,2-trifluoroethyl methacrylate, 2,2,3,3-tetrafluoropropyl methacrylate, 1H-hexafluoroisopropyl methacrylate, 1H,1H,5H-octafluoropentyl methacrylate, 1H,1H,2H,2H-heptadecafluorodecyl methacrylate, 2,6-dibromo-4-butylphenyl methacrylate, 2,4,6-tribromophenoxyethyl methacrylate and 2,4,6-tribromophenol 3EO-added methacrylate;

Mono-functional ether-containing methacrylates, e.g., 2-methoxyethyl methacrylate, 1,3-butylene glycol methyl ether methacrylate, butoxyethyl methacrylate, methoxytriethylene glycol methacrylate, methoxypolyethylene glycol #400 methacrylate, methoxydipropylene glycol methacrylate, methoxytripropylene glycol methacrylate, methoxypolypropylene glycol methacrylate, ethoxydiethylene glycol methacrylate, 2-ethylhexyl carbitol methacrylate, tetrahydrofurfuryl methacrylate, phenoxyethyl methacrylate, phenoxydiethylene glycol methacrylate, phenoxypolyethylene glycol methacrylate, cresyl polyethylene glycol methacrylate, p-nonylphenoxyethyl methacrylate, p-nonylphenoxypolyethylene glycol methacrylate and glycidyl methacrylate;

Mono-functional carboxyl-containing methacrylates, e.g., β-carboxyethyl methacrylate, succinic acid monomethacryloyloxyethyl ester, ω-carboxypolycaprolactone monomethacrylate, 2-methacryloyloxyethyl hydrogen phthalate, 2-methacryloyloxypropyl hydrogen phthalate, 2-methacryloyloxypropyl hexahydrohydrogen phthalate and 2-methacryloyloxypropyl tetrahydrohydrogen phthalate;

Other mono-functional methacrylates, e.g., N,N-dimethylaminoethyl methacrylate, N,N-dimethylaminopropyl methacrylate, morpholinoethyl methacrylate, trimethylsiloxyethyl methacrylate, diphenyl-2-methacryloyloxyethyl phosphate, 2-methacryloyloxyethyl acid phosphate and caprolactone-modified-2-methacryloyloxyethyl acid phosphate;

Bi-functional methacrylates, e.g., 1,4-butanediol dimethacrylate, 1,6-hexanediol dimethacrylate, diethylene glycol dimethacrylate, triethylene glycol diacrylate, tetraethylene glycol dimethacrylate, polyethylene glycol #200 dimethacrylate, polyethylene glycol #300 dimethacrylate, polyethylene glycol #400 dimethacrylate, polyethylene glycol #600 dimethacrylate, dipropylene glycol dimethacrylate, tripropylene glycol dimethacrylate, tetrapropylene glycol dimethacrylate, polypropylene glycol #400 dimethacrylate, polypropylene glycol #700 dimethacrylate, neopentyl glycol dimethacrylate, neopentyl glycol PO-modified dimethacrylate, hydroxypivalic acid/neopentyl glycol ester dimethacrylate, caprolactone-added dimethacrylate of hydroxypivalic acid/neopentyl glycol ester, 1,6-hexanediolbis(2-hydroxy-3-methacryloyloxypropyl)ether, 1,9-nonanediol dimethacrylate, pentaerythritol dimethacrylate, pentaerythritol dimethacrylate monostearate, pentaerythritol dimethacrylate monobenzoate, bisphenol A dimethacrylate, EO-modified bisphenol A dimethacrylate, PO-modified bisphenol A dimethacrylate, hydrogenated bisphenol A dimethacrylate, EO-modified hydrogenated bisphenol A dimethacrylate, PO-modified hydrogenated bisphenol A dimethacrylate, bisphenol F dimethacrylate, EO-modified bisphenol F dimethacrylate, PO-modified bisphenol F dimethacrylate, EO-modified tetrabromobisphenol A dimethacrylate, tricyclodecane dimethylol dimethacrylate and isocyanuric acid EO-modified dimethacrylate;

Tri-functional methacrylates, e.g., glycerin PO-modified trimethacrylate, trimethylolpropane trimethacrylate, trimethylolpropane EO-modified trimethacrylate, trimethylolpropane PO-modified trimethacrylate, isocyanuric acid EO-modified trimethacrylate, isocyanuric acid EO-modified, ε-caprolactone-modified trimethacrylate, 1,3,5-trimethacryloylhexahydro-s-triazine, pentaerythritol trimethacrylate and dipentaerythritol trimethacrylate tripropionate;

Tetra- or more functional methacrylates, e.g., pentaerythritol tetramethacrylate, dipentaerythritol pentamethacrylate monopropionate, dipentaerythritol hexamethacrylate, tetramethylolmethane tetramethacrylate, oligoester tetramethacrylate and tris(methacryloyloxy)phosphate;

Allylates, e.g., allyl glycidyl ether, diallyl phthalate, triallyl trimellitate and isocyanuric acid triallylate;

Acid amides, e.g., acrylamide, N-methylol acrylamide, diacetone acrylamide, N,N-dimethyl acrylamide, N,N-diethyl acrylamide, isopropyl acrylamide, acryloyl morpholine, methacrylamide, N-methylol methacrylamide, diacetone methacrylamide, N,N-dimethyl methacrylamide, N,N-diethyl methacrylamide, isopropyl methacrylamide and methacryloyl morpholine;

Styrenes, e.g., styrene, p-hydroxystyrene, p-chlorostyrene, p-bromostyrene, p-methylstyrene, p-methoxystyrene, p-t-butoxystyrene, p-t-butoxycarbonylstyrene, p-t-butoxycarbonyloxystyrene and 2,4-diphenyl-4-methylpentene; and Other vinyl compounds, e.g., vinyl acetate, vinyl monochloroacetate, vinyl benzoate, vinyl pivalate, vinyl butyrate, vinyl laurate, vinyl adipate, vinyl methacrylate, vinyl crotonate, vinyl 2-ethylhexanoate, N-vinylcarbazole and N-vinylpyrrolidone.

These compounds useful for the radical-polymerizable compound (B) for the present invention are supplied from the makers described below: Kyoeisha Chemical Co., Ltd. (product name: Light Acrylate, Light Ester, Epoxy Ester, Urethane Acrylate and Highly Functional Oligomer series), Shin-Nakamura Chemical Co., Ltd. (NK ester and NK oligo series), Hitachi Chemical Co., Ltd. (Funcryl series), Toagosei Co., Ltd. (Aronics M series), Daihachi Chemical Industry Co., Ltd(Functional monomer series), Osaka Organic Chemical Industry Ltd.(Special Acrylic Monomer series), Mitsubishi Rayon Co., Ltd.(Acryester and Diabeam Oligomer series), Nippon Kayaku Co., Ltd. (Kayarad and Kayamer series), Nippon Shokubai Co., Ltd. (Aacrylate/Methacrylate Ester monomer series), The Nippon Synthetic Chemical Industry Co., Ltd. (NICHIGO-UV Urethane Aacrylate Oligomer series), Shin-Etsu Vinyl Acetate Co., Ltd (Carboxylic Acid Vinyl Eester Monomer series), and Kohjin Co., Ltd. (Functional Monomer series).

The cyclic compounds described below are also useful for the radical-polymerizable compound (B).

Examples of 3-membered cyclic compounds: vinyl cyclopropanes described by Journal of Polymer Science, Polymer Chemistry Edition, Vol. 17, pp. 3169 (1979); 1-phenyl-2-vinyl cyclopropanes described by Makromolekulare Chemie, Rapid Communications, Vol. 5, p. 63 (1984); 2-phenyl-3-vinyl oxyranes described by Journal of Polymer Science, Polymer Chemistry Edition, Vol. 23, p. 1931 (1985) and Journal of Polymer Science, Polymer Letters Edition, Vol. 21, p. 4331 (1983); and 2,3-divinyl oxyranes described by the Chemical Society of Japan's 50$^{th}$ Springtime symposium proceedings, p. 1564 (1985).

Examples of cyclic ketenes: The following cyclic ketenes; 2-methylene-1,3-dioxepane described by Journal of Polymer Science, Polymer Chemistry Edition, Vol. 20, p. 3021 (1982) and Journal of Polymer Science, Polymer Letters Edition, Vol. 21, p. 373 (1983); dioxolans described by Polymer Preprints, Vol. 34, p. 152 (1985); 2-methylene-4-phenyl-1,3-dioxepanes described by Journal of Polymer Science, Polymer Letters Edition, Vol. 20, p. 361 (1982), Makromoleklare Chemie, Vol. 183, p. 1913 (1982) and Makromoleklare Chemie, Vol. 186, p. 1543 (1985); 4,7-dimethyl-2-methylene-1,3-dioxepanes described by Macromolecules, Vol. 15, p. 1711 (1982); and 5,6-benzo-2-methylene-1,3-dioxepanes described by Polymer Preprints, Vol. 34, p. 154 (1985).

Those compounds described in the following literature are also useful for the radical-polymerizable compound (B); Kakyozai-handbook, Shinzo Yamashita et al, Taiseisha, 1981; UV/EB koka-handbook (Genryo hen), Kiyoshi Kato et al, Kobunshi Kanko Kai, 1985; UV/EB koka gijutu no ouyou to sijou, RadTech Japan, p. 79, CMC, 1987; Sin kankouseijusi no jissai gijutu, Kiyoshi Akamatu, CMC, 1987; Netu koukasei koubunsi no seimituka, Takeshi Endoh, CMC, 1986; and Polyester jusi Handbook, Ei-ichi Takiyama, Nikkan Kogyo Simbun, 1988.

The polymerizable composition for the present invention may be incorporated with a carboxyl-containing polymer (C), described below, to make a photoresist material for, e.g., imaging, where the carboxyl-containing polymer (C) is a copolymer of acrylate or methacrylate ester (hereinafter referred-to as (meth)acrylate ester) and acrylic acid, or copolymer of (meth)acrylate ester, (meth)acrylic acid and vinyl monomer copolymerizable therewith, among others. These copolymers may be used either singly or in combination.

Examples of the (meth)acrylate esters include methyl acrylate, ethyl acrylate, butyl acrylate, 2-ethylhexyl acrylate, isobornyl acrylate, methyl methacrylate, ethyl methacrylate, butyl methacrylate, 2-ethylhexyl methacrylate and isobornyl methacrylate.

Example of vinyl monomers copolymerizable with the (meth)acrylate esters and (meth)acrylic acids include tetrahydrofurfuryl acrylate, dimethylaminoethyl acrylate, glycidyl acrylate, 2,2,2-trifluoroethyl acrylate, 2,2,3,3-tetrafluoropropyl acrylate, tetrahydrofurfuryl methacrylate, dimethylaminoethyl methacrylate, glycidyl methacrylate, 2,2,2-trifluoroethyl methacrylate, acrylamide and styrene.

The radical-polymerizable compound (B) for the present invention can be used singly or in combination more than two in arbitrary ratio to improve the intended characteristics of the composition. It is preferable to incorporate 0.01 to 20 parts by weight of the polymerization initiator (A) of the present invention per 100 parts by weight of the radical-polymerizable compound (B), more preferably 0.1 to 10 parts by weight to secure still improved characteristics of the cured polymer. At below 0.01 parts by weight, there is a tendency that the polymerization reaction does not sufficiently proceed. At above 20 parts by weight, on the other hand, the product polymer tends to have deteriorated characteristics, e.g., strength.

It is preferable to incorporate 20 to 500 parts by weight of the carboxyl-containing polymer (C) per 100 parts by weight of the radical-polymerizable compound (B), more preferably 50 to 150 parts by weight, when the polymerizable composition is to be used as a material for, e.g., photoresists. At a carboxyl-containing polymer (C) content is beyond the above range, there is a tendency that good image patterns are not produced.

The polymerizable composition of the present invention may be spread on a glass sheet, aluminum sheet, other metallic sheets or plastic film of, e.g., polyethylene terephthalate or polyethylene, after being incorporated with a binder, e.g., organic polymer.

Examples of the above-mentioned binders include polymers and copolymers of polyacrylates, poly-α-alkyl acrylates, polyamides, polyvinyl acetals, polyformaldehydes, polyurethanes, polycarbonates, polystyrenes and polyvinyl esters. More specifically, they include polymethacrylate, polymethyl methacrylate, polyethyl methacrylate, polyvinyl carbazole, polyvinyl pyrrolidone, polyvinyl butyral, polyvinyl acetate, novolac resin, phenol resin, epoxy resin, alkyd resin, and other known organic polymers described by, e.g., "Sin kankouseijusi no jissai gijutu", Kiyoshi Akamatu, CMC, 1987 and Takashi Endoh, CMC, 1986 and "10188 no kagaku syouhin", p. 657 to 767, Kagaku Kogyo Nippo, 1988.

The polymerizable composition of the present invention may be incorporated with a solvent, as required, to adjust viscosity and other objects for improving spreadability. The solvents for the polymerizable composition of the present invention are not limited, so long as they can be homogeneously mixed with the polymerizable composition of the present invention. They include known solvents, e.g., those based on alcohols, ketones, esters, aromatics, hydrocarbons and halogenated hydrocarbons. More specifically, they include, but are not limited to, cyclohexanone, methylethylketone, methylisobutylketone, propylene glycol monomethyl ether acetate, isoamyl acetate and butyl acetate.

The polymerizable composition of the present invention exhibits sufficient sensitivity, but may be incorporated with a sensitizer or another photopolymerization initiator, to further improve its sensitivity and characteristics of the cured film. Examples of the above-mentioned photopolymerization initiators include, but not limited to, benzophenones, e.g., benzophenone, 4-methyl benzophenone, 2,4,6-trimethyl benzophenone, 4,4'-dimethyl benzophenone, 4,4'-dimethoxybenzophenone and 4,4'-bis(dimethyl)benzophenone; coumarins, e.g., coumarin 1, coumarin 338 and coumarin 102; ketocoumarins, e.g., 3,3'-carbonylbis(7-diethylaminocoumarin); and commercial products described in Ciba Specialty Chemicals KK's general photopolymerization initiator catalog (1997), e.g., Irgacure 651, Irgacure 184, Darocure 1173, Irgacure 500, Irgacure 1000, Irgacure 2959, Irgacure 907, Irgacure 369, Irgacure 1700, Irgacure 149, Irgacure 1800, Irgacure 1850, Irgacure 819, Irgacure 784 and Irgacure 261.

Moreover, there are many photopolymerization initiators which can be used in combination with the initiators described above. They include triazine derivatives described by Japanese Patent Publication Nos.59-1281 and 61-9621 and Japanese Patent Laid-open Publication No. 60-60104; o-quinonediazides described by U.S. Pat. No. 2,848,328, and Japanese Patent Publication Nos.36-22062, 37-13109, 38-18015 and 45-9610; a variety of onium compounds such as iodonium compounds described by Japanese Patent Publication No. 55-39162, Japanese Patent Laid-open Publication No. 59-140203 and Macromolecules, Vol. 10, p. 1307 (American Chemical Society, 1977); azo compounds described by Japanese Patent Laid-open Publication No. 59-142205; metal/arene complexes described by Japanese Patent Laid-open Publication No. 1-54440, EP Patent Nos. 109,851 and 126,712, and Journal of Imaging Science, Vol. 30, p. 174 (1986); titanocenes described by Japanese Patent Laid-open Publication No. 61-151197; 2,4,5-triarylimidazole dimmer and 2,2'-bis(o-chlorophenyl)-4,4', 5,5'-tetraphenyl-1,1'-biimidazole described by Japanese Patent Laid-open Publication Nos.55-127550 and 60-202437; and organohalogen compounds described by Japanese Patent Laid-open Publication No. 59-107344.

The polymerizable composition of the present invention may be incorporated with a thermal polymerization inhibitor to prevent polymerization while being stored. Typical examples of the above-mentioned thermal polymerization inhibitors include, but are not limited to, p-methoxyphenol, hydroquinone, alkyl-substituted hydroquinone, catechol, tert-butylcatechol and phenothiazine. It is preferably incorporated at 0.001 to 5 parts by weight per 100 parts by weight of the radical-polymerizable compound (B).

Moreover, the polymerizable composition of the present invention may be incorporated with a polymerization promoter or chain transfer agent represented by amine, thiol and disulfide. Typical examples of the above-mentioned polymerization promoters and chain transfer agents include, but are not limited to, amines, e.g., N-phenyl glycin, triethanolamine and N,N-diethylaniline; thiols described by U.S. Pat. No. 4,414,312 and Japanese Patent Laid-open Publication No. 64-13144; disulfides described by Japanese Patent Laid-open Publication No. 2-291561; thiones described by GBP No. 3,558,322 and Japanese Patent Laid-open Publication No. 64-17048; and o-acylthiohydroxamate and N-alkoxypyridinethiones described by Japanese Patent Laid-open Publication No. 2-291560.

The polymerizable composition of the present invention may be further incorporated, as required for specific purposes, with, e.g., a dye, organic or inorganic pigment, oxygen remover (e.g., phosphine, phosphonate or phosphite), reducing agent, anti-fogging agent, fading inhibitor, halation inhibitor, fluorescent whitener, surfactant, colorant, plasticizer, flame retardant, antioxidant, dye precursor, ultraviolet absorber, fungicide, antistatic agent, magnetic substance, or organic solvent for dilution. Therefore, it is applicable to a variety of photosensitive materials, e.g., ink, printing materials, photoresists and electronic photographing, direct printing and hologram materials, after being spread on a base material together with a binder, and a variety of recording media, and microcapsules. It is also applicable to adhesives, tack agents, tack/adhesive agents, sealants and a variety of paints. When the polymerizable composition of the present invention is used after being spread on a base material, the thickness of the polymerizable composition may be arbitrarily set.

Any known ultraviolet ray source may be used, when the polymerizable composition of the present invention is to be cured with ultraviolet rays. Examples of ultraviolet ray sources include high-pressure mercury lamp, super high-pressure mercury lamp, medium-pressure mercury lamp, low-pressure mercury lamp, xenon lamp, metal halide lamp, fluorescent lamp, tungsten lamp and a variety of lasers. The ray source preferably has an irradiation wavelength in a range of 300 to 400 nm, in which the polymerization initiator (A) for the present invention has an adequate absorption. When the polymerizable composition is irradiated with light, a known filter may be used to select wavelength or control irradiation energy at an adequate level.

The polymerization initiator for the present invention functions as a radical-polymerization initiator sensitive to irradiation light in an ultraviolet range. The polymerization initiator (A), although having yellow color before being irradiated with light, has greatly decreased extent of coloring after being irradiated with light to an almost colorless condition. The reaction mechanisms involved in the above phenomenon are discussed as follows. The sulfonium structure in the polymerization initiator (A) itself has an adequate absorption at 365 or 405 nm (bright line of a mercury lamp) and absorption in a range of 340 to 420 nm (wavelength range of a metal halide lamp), and hence works as a polymerization initiator having a sensitizing function. In other words, it is considered that the polymerization initiator works as a very sensitive initiator, when optically excited with ultraviolet rays, because it is swiftly photolyzed to generate the radicals due to the very efficient intra-molecular electron or energy transfer triggered. The sulfonium structure in the polymerization initiator (A) may have yellow color, because of its relatively high absorption in the irradiation ultraviolet ray range. However, this absorption shifts to the shorter wavelength side when the radicals are generated, or the initiator is photolyzed. As a result, it has greatly decreased extent of coloring after being irradiated with ultraviolet rays, and can turn colorless or almost colorless. Moreover, it is considered that the sulfonium structure in the polymerization initiator (A), being a good electron acceptor, is itself decomposed when optically excited, and, at the same time, efficiently accelerates the decomposition, when the counter anion is an electron donor. When the anion $Z^-$ in the formula (1) is a borate anion represented by the formula (2), the borate anion is not only a good electron donor but also decomposed to generate the free radicals. In this case, therefore, the free radicals are generated both by the sulfonium cation and borate anion, to give a very high sensitivity.

The present invention will be described in detail by EXAMPLES which by no means limit the invention. "Parts" in each EXAMPLE means parts by weight, unless otherwise stated. Some of SYNTHETIC EXAMPLES in which the polymerization initiator (A) for the present invention is synthesized are FIRST described before presenting EXAMPLES.

SYNTHETIC EXAMPLE 1

Synthesis of the Compound (1)

0.99 parts of dimethyl(2-(4-N,N-dimethylaminophenyl)-2-oxoethyl)sulfonium bromide was dissolved in 100 parts of ion-exchanged water, to which 100 parts of an aqueous solution containing 1.00 parts of lithium butyltriphenylborate was added dropwise, with stirring, at 25° C. in 10 minutes. The pale yellowish crystal produced was filtered, washed with distilled water and dried under a vacuum to obtain 1.24 parts of the compound (1).

Compound identified by elementary analysis: $C_{34}H_{42}BNOS$

| Theoretical composition | C: 77.99, H: 8.09, N: 2.68, S: 6.12 |
| --- | --- |
| Measured composition | C: 78.00, H: 8.08, N: 2.69, S: 6.10 |

SYNTHETIC EXAMPLE 2

Synthesis of the Compound (3)

1.21 parts of 1-[2-(4-morpholino-4-yl-phenyl)-2-oxoethyl]tetrahydrothiophenium bromide was dissolved in 100 parts of acetonitrile, to which 100 parts of an aqueous solution containing 1.00 parts of lithium butyltriphenylborate was added dropwise, with stirring, at 25° C. in 10 minutes, and then 500 parts of ion-exchanged water was added. The pale yellowish crystal produced was filtered, washed with distilled water and dried under a vacuum to obtain 1.14 parts of the compound (3).

Compound identified by elementary analysis: $C_{38}H_{46}BNO_2S$

| Theoretical composition | C: 77.14, H: 7.84, N: 2.37, S: 5.42 |
| --- | --- |
| Measured composition | C: 77.12, H: 7.84, N: 2.38, S: 5.40 |

SYNTHETIC EXAMPLE 3

Synthesis of the Compound (4)

1.08 parts of (2-(4-N,N-diethylaminophenyl)-2-oxoethyl)dimethyl sulfonium bromide was dissolved in 100 parts of acetonitrile, to which 100 parts of an aqueous solution containing 1.00 parts of lithium butyltriphenylborate was added dropwise, with stirring, at 25° C. in 10 minutes, and then 500 parts of ion-exchanged water was added. The pale yellowish crystal produced was filtered, washed with distilled water and dried under a vacuum to obtain 1.20 parts of the compound (4).

Compound identified by elementary analysis: $C_{36}H_{46}BNOS$

| Theoretical composition | C: 78.38, H: 8.41, N: 2.54, S: 5.81 |
| --- | --- |
| Measured composition | C: 78.30, H: 8.40, N: 2.53, S: 5.77 |

SYNTHETIC EXAMPLE 4

Synthesis of the Compound (5)

1.23 parts of bis(2-hydroxyethyl)[2-[4-(N-ethyl-N-methylamino)phenyl]-2-oxoethyl]sulfonium bromide was dissolved in 100 parts of acetonitrile, to which 100 parts of an aqueous solution containing 1.00 parts of lithium butyltriphenylborate was added dropwise, with stirring, at 25° C. in 10 minutes, and then 500 parts of ion-exchanged water was added. The pale yellowish crystal produced was filtered, washed with distilled water and dried under a vacuum to obtain 1.24 parts of the compound (5).

Compound identified by elementary analysis: $C_{37}H_{48}BNO_3S$

| Theoretical composition | C: 74.36, H: 8.10, N: 2.34, S: 5.37 |
| --- | --- |
| Measured composition | C: 74.40, H: 8.12, N: 2.31, S: 5.37 |

SYNTHETIC EXAMPLE 5

Synthesis of the Compound (6)

1.47 parts of ([2-(4-N,N-dibutylaminophenyl)-2-oxoethyl]methylphenylsulfonium bromide was dissolved in 100 parts of acetonitrile, to which 100 parts of an aqueous solution containing 1.00 parts of lithium butyltriphenylborate was added dropwise, with stirring, at 25° C. in 10 minutes, and then 500 parts of ion-exchanged water was added. The pale yellowish crystal produced was filtered, washed with distilled water and dried under a vacuum to obtain 1.28 parts of the compound (6).

Compound identified by elementary analysis: $C_{45}H_{56}BNOS$

| Theoretical composition | C: 80.69, H: 8.43, N: 2.09, S: 4.79 |
| --- | --- |
| Measured composition | C: 80.69, H: 8.40, N: 2.10, S: 4.77 |

SYNTHETIC EXAMPLE 6

Synthesis of the Compound (7)

1.05 parts of 2-ethyl-7-(N-ethyl-N-hexylamino)-4-oxoisothiochromanium bromide was dissolved in 100 parts of acetonitrile, to which 100 parts of an aqueous solution containing 1.00 parts of lithium butyltriphenylborate was added dropwise, with stirring, at 25° C. in 10 minutes, and then 500 parts of ion-exchanged water was added. The pale yellowish crystal produced was filtered, washed with distilled water and dried under a vacuum to obtain 1.40 parts of the compound (7).

Compound identified by elementary analysis: $C_{41}H_{54}BNOS$

| Theoretical composition | C: 79.46, H: 8.78, N: 2.26, S: 5.17 |
| --- | --- |
| Measured composition | C: 79.40, H: 8.71, N: 2.28, S: 5.16 |

SYNTHETIC EXAMPLE 7

Synthesis of the Compound (8)

1.54 parts of [2-[4-N-(butyl-N-methylamino)phenyl]-2-oxoethyl]diphenylsulfonium bromide was dissolved in 100 parts of acetonitrile, to which 100 parts of an aqueous solution containing 1.00 parts of lithium butyltriphenylborate was added dropwise, with stirring, at 25° C. in 10 minutes, and then 500 parts of ion-exchanged water was added. The pale yellowish crystal produced was filtered, washed with distilled water and dried under a vacuum to obtain 1.14 parts of the compound (8).

Compound identified by elementary analysis: $C_{47}H_{52}BNOS$

| Theoretical composition | C: 81.84, H: 7.60, N: 2.03, S: 4.65 |
| --- | --- |
| Measured composition | C: 81.80, H: 7.54, N: 2.02, S: 4.66 |

SYNTHETIC EXAMPLE 8

Synthesis of the Compound (9)

1.18 parts of 6-(N-cyclohexyl-N-methylamino)-1-methyl-3-oxo-2,3-dihydrobenzo[b]thiophenium bromide was dissolved in 100 parts of acetonitrile, to which 100 parts of an aqueous solution containing 1.00 parts of lithium butyltriphenylborate was added dropwise, with stirring, at 25° C. in 10 minutes, and then 500 parts of ion-exchanged water was added. The pale yellowish crystal produced was filtered, washed with distilled water and dried under a vacuum to obtain 1.21 parts of the compound (9).

Compound identified by elementary analysis: $C_{38}H_{46}BNOS$

| Theoretical composition | C: 79.28, H: 8.05, N: 2.43, S: 5.57 |
| --- | --- |
| Measured composition | C: 79.23, H: 8.00, N: 2.44, S: 5.50 |

SYNTHETIC EXAMPLE 9

Synthesis of the Compound (10)

1.68 parts of [2-[4-N-butyl-N-methylamino]-3-(2-hydroxyethyl)phenyl]-2-oxoethyl]diphenylsulfonium bromide was dissolved in 100 parts of acetonitrile, to which 100 parts of an aqueous solution containing 1.00 parts of lithium butyltriphenylborate was added dropwise, with stirring, at 25° C. in 10 minutes, and then 500 parts of ion-exchanged water was added. The pale yellowish crystal produced was filtered, washed with distilled water and dried under a vacuum to obtain 1.44 parts of the compound (10).

Compound identified by elementary analysis: $C_{49}H_{56}BNO_2S$

| Theoretical composition | C: 80.20, H: 7.69, N: 1.91, S: 4.37 |
| --- | --- |
| Measured composition | C: 80.14, H: 7.69, N: 1.92, S: 4.34 |

SYNTHETIC EXAMPLE 10

Synthesis of the Compound (11)

1.38 parts of [2-(2-diethylamino-4-ethylphenyl)-2-oxoethyl]methylphenylsulfonium bromide was dissolved in 100 parts of acetonitrile, to which 100 parts of an aqueous solution containing 1.00 parts of lithium butyltriphenylborate was added dropwise, with stirring, at 25° C. in 10 minutes, and then 500 parts of ion-exchanged water was added. The pale yellowish crystal produced was filtered, washed with distilled water and dried under a vacuum to obtain 1.34 parts of the compound (11).

Compound identified by elementary analysis: $C_{43}H_{52}BNOS$

| Theoretical composition | C: 80.48, H: 8.17, N: 2.18, S: 5.00 |
| --- | --- |
| Measured composition | C: 80.49, H: 8.18, N: 2.12, S: 5.01 |

SYNTHETIC EXAMPLE 11

Synthesis of the Compound (12)

0.99 parts of dimethyl[2-(2-dimethylaminophenyl)-2-oxoethyl]sulfonium bromide was dissolved in 100 parts of acetonitrile, to which 100 parts of an aqueous solution containing 1.00 parts of lithium butyltriphenylborate was added dropwise, with stirring, at 25° C. in 10 minutes, and then 500 parts of ion-exchanged water was added. The pale yellowish crystal produced was filtered, washed with distilled water and dried under a vacuum to obtain 1.25 parts of the compound (12).

Compound identified by elementary analysis: $C_{34}H_{42}BNOS$

| Theoretical composition | C: 77.99, H: 8.09, N: 2.68, S: 6.12 |
| --- | --- |
| Measured composition | C: 78.01, H: 8.09, N: 2.68, S: 6.11 |

SYNTHETIC EXAMPLE 12

Synthesis of the Compound (13)

1.52 parts of [2-(5-bromo-4-isopropyl-2-piperidin-1-yl)phenyl-2-oxoethyl)dimethylsulfonium bromide was dissolved in 100 parts of acetonitrile, to which 100 parts of an aqueous solution containing 1.00 parts of lithium butyltriphenylborate was added dropwise, with stirring, at 25° C. in 10 minutes, and then 500 parts of ion-exchanged water was added. The pale yellowish crystal produced was filtered, washed with distilled water and dried under a vacuum to obtain 1.49 parts of the compound (13).

Compound identified by elementary analysis: $C_{40}H_{51}BBrNOS$

| Theoretical composition | C: 70.17, H: 7.51, N: 2.05, S: 4.68 |
| --- | --- |
| Measured composition | C: 70.10, H: 7.58, N: 2.05, S: 4.66 |

SYNTHETIC EXAMPLE 13

Synthesis of the Compound (14)

1.33 parts of 1-[2-(3-chloro-5-N,N-diethylaminophenyl)-2-oxoethyl]tetrahydrothiopyranium bromide was dissolved in 100 parts of acetonitrile, to which 100 parts of an aqueous solution containing 1.00 parts of lithium butyltriphenylborate was added dropwise, with stirring, at 25° C. in 10 minutes, and then 500 parts of ion-exchanged water was added. The pale yellowish crystal produced was filtered, washed with distilled water and dried under a vacuum to obtain 1.49 parts of the compound (14).

Compound identified by elementary analysis: $C_{39}H_{49}BClNOS$

| Theoretical composition | C: 74.81, H: 7.89, N: 2.24, S: 5.12 |
| --- | --- |
| Measured composition | C: 74.88, H: 7.89, N: 2.24, S: 5.09 |

SYNTHETIC EXAMPLE 14

Synthesis of the Compound (15)

0.99 parts of dimethyl[2-(3-N,N-dimethylaminophenyl)-2-oxoethyl]sulfonium bromide was dissolved in 100 parts of acetonitrile, to which 100 parts of an aqueous solution containing 1.00 parts of lithium butyltriphenylborate was added dropwise, with stirring, at 25° C. in 10 minutes, and then 500 parts of ion-exchanged water was added. The pale yellowish crystal produced was filtered, washed with distilled water and dried under a vacuum to obtain 1.21 parts of the compound (15).

Compound identified by elementary analysis: $C_{34}H_{42}BNOS$

| Theoretical composition | C: 77.99, H: 8.09, N: 2.68, S: 6.12 |
| Measured composition | C: 77.91, H: 8.02, N: 2.64, S: 6.10 |

SYNTHETIC EXAMPLE 15

Synthesis of the Compound (16)

1.15 parts of [2-(4-dibutylamino-2-ethylphenyl)-2-oxoethyl]dimethylsulfonium bromide was dissolved in 100 parts of acetonitrile, to which 100 parts of an aqueous solution containing 1.00 parts of lithium butyl tris(3-fluorophenyl)borate was added dropwise, with stirring, at 25° C. in 10 minutes, and then 500 parts of ion-exchanged water was added. The pale yellowish crystal produced was filtered, washed with distilled water and dried under a vacuum to obtain 0.99 parts of the compound (16).

Compound identified by elementary analysis: $C_{42}H_{55}BF_3NOS$

| Theoretical composition | C: 73.13, H: 8.04, N: 2.03, S: 4.65 |
| Measured composition | C: 73.05, H: 8.06, N: 2.04, S: 4.69 |

SYNTHETIC EXAMPLE 16

Synthesis of the Compound (17)

1.37 parts of [2-(4-butoxy-2-N,N-diethylaminophenyl)-2-oxoethyl]methyphenylsulfonium bromide was dissolved in 100 parts of acetonitrile, to which 100 parts of an aqueous solution containing 1.00 parts of sodium tetraphenylborate was added dropwise, with stirring, at 25° C. in 10 minutes, and then 500 parts of ion-exchanged water was added. The pale yellowish crystal produced was filtered, washed with distilled water and dried under a vacuum to obtain 1.24 parts of the compound (17).

Compound identified by elementary analysis: $C_{47}H_{52}BNO_2S$

| Theoretical composition | C: 79.98, H: 7.43, N: 1.98, S: 4.54 |
| Measured composition | C: 80.00, H: 7.43, N: 1.99, S: 4.50 |

SYNTHETIC EXAMPLE 17

Synthesis of the Compound (18)

0.93 parts of [2-(4-N,N-dimethylamino-3-methylphenyl)-2-oxoethyl]dimethylsulfonium bromide was dissolved in 100 parts of acetonitrile, to which 100 parts of an aqueous solution containing 1.00 parts of sodium tetraphenylborate was added dropwise, with stirring, at 25° C. in 10 minutes, and then 500 parts of ion-exchanged water was added. The pale yellowish crystal produced was filtered, washed with distilled water and dried under a vacuum to obtain 1.04 parts of the compound (18).

Compound identified by elementary analysis: $C_{37}H_{40}BNOS$

| Theoretical composition | C: 79.70, H: 7.23, N: 2.51, S: 5.75 |
| Measured composition | C: 79.71, H: 7.24, N: 2.52, S: 5.78 |

SYNTHETIC EXAMPLE 18

Synthesis of the Compound (19)

1.44 parts of [2-(4-N,N-dibutylamino-2-ethoxy phenyl)-2-oxoethyl]bis(2-hydroxyethyl)sulfonium bromide was dissolved in 100 parts of acetonitrile, to which 100 parts of an aqueous solution containing 1.00 parts of sodium tetraphenylborate was added dropwise, with stirring, at 25° C. in 10 minutes, and then 500 parts of ion-exchanged water was added. The pale yellowish crystal produced was filtered, washed with distilled water and dried under a vacuum to obtain 1.04 parts of the compound (19).

Compound identified by elementary analysis: $C_{46}H_{58}BNO_4S$

| Theoretical composition | C: 75.49, H: 7.99, N: 1.91, S: 4.38 |
| Measured composition | C: 75.44, H: 7.98, N: 1.92, S: 4.34 |

EXAMPLES 1 TO 15, AND COMPARATIVE EXAMPLES 1 TO 15

The coating solutions of the polymerizable compositions given in Table 1 were prepared by 6 parts of the polymerization initiator (A), 100 parts of pentaerythritol triacrylate as the radical-polymerizable compound (B), 1,600 parts of cyclohexanone as a solvent and 0 or 3 parts of sensitizer.

Each coating solution was spread on a glass sheet by a spin coater, and dried at 60° C. for 10 minutes. The film thickness was about 1.5 $\mu$m, after the solvent was removed by drying. A 25-$\mu$m thick PET film was pressed to the coated surface, to prepare a sample of the polymerizable composition. The sample was irradiated with light from a high-pressure mercury lamp through a band pass filter selectively passing light of 350 to 380 nm to apply an energy of 5 mJ/cm$^2$ thereto.

Table 1 gives the evaluation results of tack of the film of the polymerizable composition after it was irradiated with light, and color of the film of the composition before and after it was irradiated with light. The polymerization initiators and sensitizers used in COMPARATIVE EXAMPLES had the following structures:

TABLE 1
Compound (26) 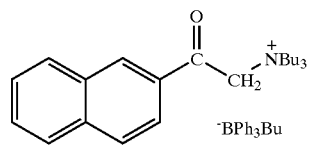
Compound (27) 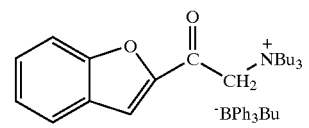
Compound (28) 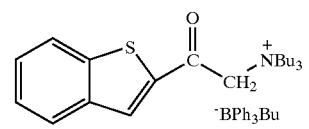
Compound (29) 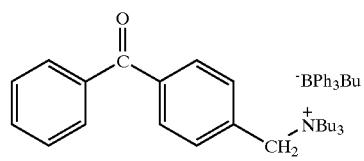
Compound (30) 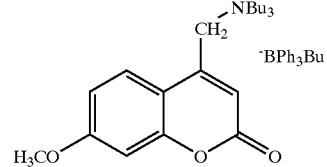
Compound (31) 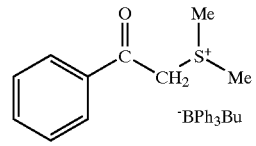
Compound (32) 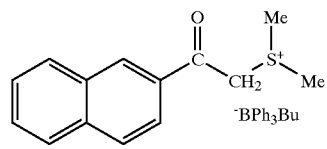
Compound (33) 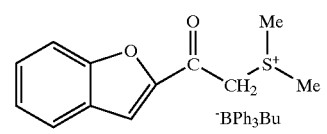
Compound (34) 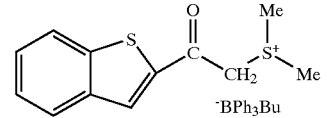
Compound (35) 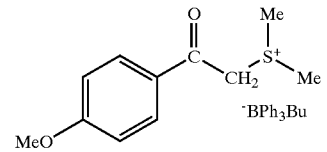

TABLE 1-continued

Compound (36) 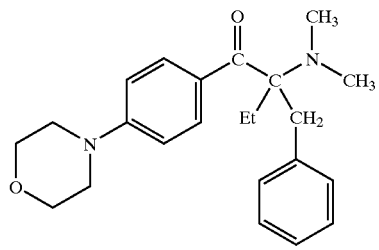

Compound (37) 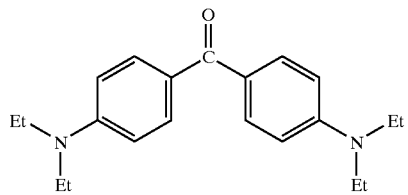

Compound (38) 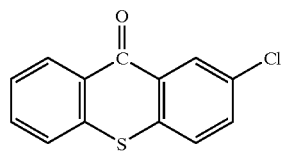

Compound (39) 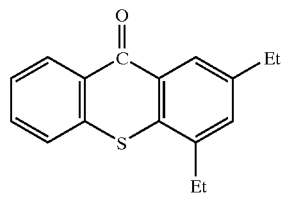

Compound (40) 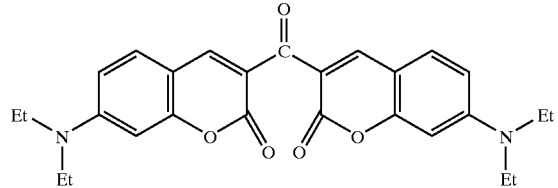

| Example Nos. | Polymerization initiators(A) | Sensitizers | Tack of light-irradiated film | Film color Before light irradiation | After light irradiation |
|---|---|---|---|---|---|
| EXAMPLE 1 | Compound (1) | Not used | ○ | pale yellow | colorless |
| EXAMPLE 2 | Compound (3) | Not used | ○ | pale yellow | colorless |
| EXAMPLE 3 | Compound (4) | Not used | ○ | pale yellow | colorless |
| EXAMPLE 4 | Compound (5) | Not used | ○ | pale yellow | colorless |
| EXAMPLE 5 | Compound (6) | Not used | ○ | pale yellow | colorless |
| EXAMPLE 6 | Compound (7) | Not used | ○ | pale yellow | colorless |
| EXAMPLE 7 | Compound (8) | Not used | ○ | pale yellow | colorless |
| EXAMPLE 8 | Compound (9) | Not used | ○ | pale yellow | colorless |
| EXAMPLE 9 | Compound (10) | Not used | ○ | pale yellow | colorless |
| EXAMPLE 10 | Compound (11) | Not used | ○ | pale yellow | colorless |
| EXAMPLE 11 | Compound (12) | Not used | ○ | pale yellow | colorless |
| EXAMPLE 12 | Compound (13) | Not used | ○ | pale yellow | colorless |
| EXAMPLE 13 | Compound (14) | Not used | ○ | pale yellow | colorless |
| EXAMPLE 14 | Compound (15) | Not used | ○ | pale yellow | colorless |
| EXAMPLE 15 | Compound (16) | Not used | ○ | pale yellow | colorless |
| COMPARATIVE EXAMPLE 1 | Compound (26) | Not used | X | colorless | colorless |
| COMPARATIVE EXAMPLE 2 | Compound (27) | Not used | X | colorless | colorless |
| COMPARATIVE EXAMPLE 3 | Compound (28) | Not used | X | colorless | colorless |
| COMPARATIVE EXAMPLE 4 | Compound (29) | Not used | X | colorless | colorless |
| COMPARATIVE EXAMPLE 5 | Compound (30) | Not used | X | colorless | colorless |
| COMPARATIVE EXAMPLE 6 | Compound (31) | Not used | X | colorless | colorless |
| COMPARATIVE EXAMPLE 7 | Compound (32) | Not used | X | colorless | colorless |
| COMPARATIVE EXAMPLE 8 | Compound (33) | Not used | X | colorless | colorless |
| COMPARATIVE EXAMPLE 9 | Compound (34) | Not used | X | colorless | colorless |

TABLE 1-continued

| COMPARATIVE EXAMPLE 10 | Compound (35) | Not used | X | colorless | colorless |
|---|---|---|---|---|---|
| COMPARATIVE EXAMPLE 11 | Compound (36) | Not used | X | colorless | colorless |
| COMPARATIVE EXAMPLE 12 | Compound (31) | Compound (37) | Δ | yellow | yellow |
| COMPARATIVE EXAMPLE 13 | Compound (31) | Compound (38) | Δ | yellow | yellow |
| COMPARATIVE EXAMPLE 14 | Compound (31) | Compound (39) | Δ | yellow | yellow |
| COMPARATIVE EXAMPLE 15 | Compound (31) | Compound (40) | Δ | deep yellow | deep yellow |

Evaluation of tack
o: No tack observed
Δ: Tack slightly observed
X: Tack observed The polymerization composition film prepared in EXAMPLE 1 have very slight yellow color before light irradiation, but became completely colorless after irradiation with light. FIG. 3 shows the absorption spectrum of the polymerization composition film prepared in EXAMPLE 1 before light irradiation and that of the cured film after light irradiation. The film had a very large absorption maximum at around 365 nm and a low absorption at around 400 nm before light irradiation. However, it was confirmed that, when the film was irradiated with light, the absorption maximum shifted to the shorter wavelength side and absorption at around 400 nm completely disappeared.

EXAMPLES 16 TO 18, AND COMPARATIVE EXAMPLES 16 TO 25

The coating solutions of the polymerizable compositions given in Table 2 were prepared by 6 parts of the polymerization initiator (A), 100 parts of pentaerythritol triacrylate as the radical-polymerizable compound (B), 1,600 parts of cyclohexanone as a solvent and 0 or 3 parts of sensitizer.

Each coating solution was spread on a glass sheet by a spin coater, and dried at 60° C. for 10 minutes. The film thickness was about 1.5 μm, after the solvent was removed by drying. A 25-μm thick PET film was pressed to the coated surface, to prepare a sample of the polymerizable composition. The sample was irradiated with light from a high-pressure mercury lamp through a band pass filter selectively passing light of 350 to 380 nm to apply an energy of 40 mJ/cm² thereto.

Table 2 gives the evaluation results of tack of the film of the polymerizable composition after it was irradiated with light, and color of the film of the composition before and after it was irradiated with light. The polymerization initiators and sensitizers used in COMPARATIVE EXAMPLES had the following structures:

TABLE 2

Compound (41)

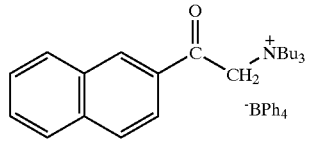

Compound (42)

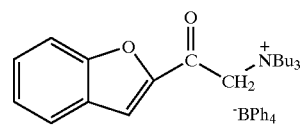

Compound (43)

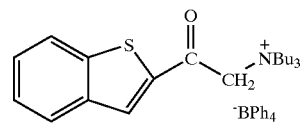

Compound (44)

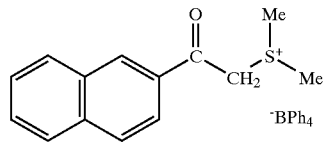

Compound (45)

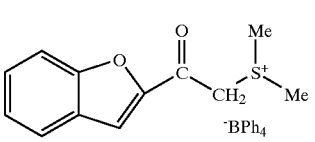

TABLE 2-continued

| | | | | |
|---|---|---|---|---|
| Compound (46) | | | | ![structure] |
| Compound (47) | | | | ![structure] |

| Example Nos. | Polymerization Initiators(A) | Sensitizers | Tack of light-irradiated film | Film color Before light irradiation | Film color After light irradiation |
|---|---|---|---|---|---|
| EXAMPLE 16 | Compound(17) | Not used | ○ | pale yellow | colorless |
| EXAMPLE 17 | Compound(18) | Not used | ○ | pale yellow | colorless |
| EXAMPLE 18 | Compound(19) | Not used | ○ | pale yellow | colorless |
| COMPARATIVE EXAMPLE 16 | Compound(41) | Not used | Δ | colorless | colorless |
| COMPARATIVE EXAMPLE 17 | Compound(42) | Not used | Δ | colorless | colorless |
| COMPARATIVE EXAMPLE 18 | Compound(43) | Not used | X | colorless | colorless |
| COMPARATIVE EXAMPLE 19 | Compound(44) | Not used | Δ | colorless | colorless |
| COMPARATIVE EXAMPLE 20 | Compound(45) | Not used | Δ | colorless | colorless |
| COMPARATIVE EXAMPLE 21 | Compound(46) | Not used | Δ | colorless | colorless |
| COMPARATIVE EXAMPLE 22 | Compound(47) | Not used | X | colorless | colorless |
| COMPARATIVE EXAMPLE 23 | Compound(47) | Compound(38) | ○ | yellow | colorless |
| COMPARATIVE EXAMPLE 24 | Compound(47) | Compound(39) | Δ | yellow | colorless |
| COMPARATIVE EXAMPLE 25 | Compound(47) | Compound(40) | Δ | deep yellow | deep yellow |

Evaluation of tack
○: No tack observed
Δ: Tack slightly observed
X: Tack observed

EXAMPLES 19 TO 24, AND COMPARATIVE EXAMPLES 26 TO 35

The coating solutions of the polymerizable compositions given in Table 3 were prepared by 6 parts of the polymerization initiator (A), 100 parts of pentaerythritol triacrylate as the radical-polymerizable compound (B), 1,600 parts of cyclohexanone as a solvent and 0 or 3 parts of sensitizer.

Each coating solution was spread on a glass sheet by a spin coater, and dried at 60° C. for 10 minutes. The film thickness was about 1.5 μm, after the solvent was removed by drying. A 25-μm thick PET film was pressed to the coated surface, to prepare a sample of the polymerizable composition. The sample was irradiated with light from a high-pressure mercury lamp through a band pass filter selectively passing light of 350 to 380 nm to apply an energy of 70 mJ/cm² thereto.

Table 3 gives the evaluation results of tack of the film of the polymerizable composition after it was irradiated with light, and color of the film of the composition before and after it was irradiated with light. The polymerization initiators and sensitizers used in COMPARATIVE EXAMPLES had the following structures:

TABLE 3

Compound (48)

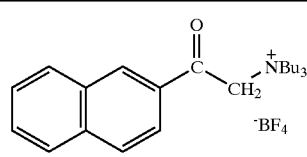

Compound (49)

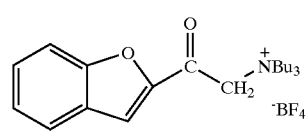

Compound (50)

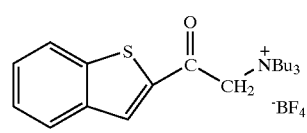

TABLE 3-continued

Compound (51) 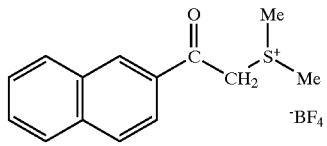

Compound (52) 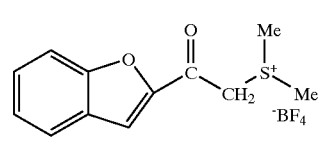

Compound (53) 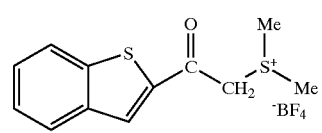

Compound (54) 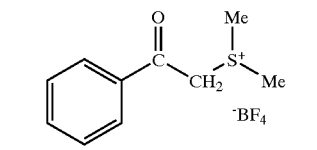

| Example Nos. | Polymerization Initiators(A) | Sensitizers | Tack of light-irradiated film | Film color Before light irradiation | Film color After light irradiation |
|---|---|---|---|---|---|
| EXAMPLE 19 | Compound(20) | Not used | ○ | pale yellow | colorless |
| EXAMPLE 20 | Compound(21) | Not used | ○ | pale yellow | colorless |
| EXAMPLE 21 | Compound(22) | Not used | ○ | pale yellow | colorless |
| EXAMPLE 22 | Compound(23) | Not used | ○ | pale yellow | colorless |
| EXAMPLE 23 | Compound(24) | Not used | ○ | pale yellow | colorless |
| EXAMPLE 24 | Compound(25) | Not used | ○ | pale yellow | colorless |
| COMPARATIVE EXAMPLE 26 | Compound(48) | Not used | X | colorless | colorless |
| COMPARATIVE EXAMPLE 27 | Compound(49) | Not used | X | colorless | colorless |
| COMPARATIVE EXAMPLE 28 | Compound(50) | Not used | X | colorless | colorless |
| COMPARATIVE EXAMPLE 29 | Compound(51) | Not used | Δ | colorless | colorless |
| COMPARATIVE EXAMPLE 30 | Compound(52) | Not used | Δ | colorless | colorless |
| COMPARATIVE EXAMPLE 31 | Compound(53) | Not used | Δ | colorless | colorless |
| COMPARATIVE EXAMPLE 32 | Compound(54) | Not used | X | colorless | colorless |
| COMPARATIVE EXAMPLE 33 | Compound(54) | Compound(38) | ○ | yellow | yellow |
| COMPARATIVE EXAMPLE 34 | Compound(54) | Compound(39) | Δ | yellow | yellow |
| COMPARATIVE EXAMPLE 35 | Compound(54) | Compound(40) | ○ | deep yellow | deep yellow |

Evaluation of tack
○: No tack observed
Δ: Tack slightly observed
X: Tack observed

EXAMPLES 25 TO 40

The experiments were conducted in exactly the same manner as in EXAMPLE 1, except that 100 parts by weight of pentaerythritol triacrylate was replaced by 100 parts of the radical-polymerizable compound (B) listed in Table 4. A tack-free film was produced in each EXAMPLE. It was confirmed that the polymerizable composition film, which have a yellowish color before light irradiation, greatly decreased in color extent after light irradiation, turning almost colorless.

TABLE 4

| EXAMPLES | Radical-polymerizable compounds (B) |
|---|---|
| 25 | Trimethylolpropane triacrylate |
| 26 | 2-Ethylhexyl acrylate |
| 27 | 2-Hydroxyethyl acrylate |
| 28 | 1,6-Hexanediol diacrylate |
| 29 | Ethylene glycol diacrylate |
| 30 | Polypropylene glycol diacrylate |
| 31 | Pentaerythritol diacrylate |
| 32 | Pentaerythritol tetracrylate |
| 33 | Dipentaerythritol hexaacrylate |
| 34 | 2-Ethylhexyl methacrylate |
| 35 | Glycidyl methacrylate |
| 36 | 1,6-Hexanediol dimethacrylate |
| 37 | Diethylene glycol methacrylate |
| 38 | Trimethylolpropane trimethacrylate |
| 39 | Diallyl phthalate |
| 40 | Triallyltrimellitate |

EXAMPLES 41 TO 55, and COMPARATIVE EXAMPLES 36 TO 50

The coating solutions of the polymerizable compositions given in Table 5 were prepared by 3 parts of the polymerization initiator (A), 50 parts of pentaerythritol triacrylate as the radical-polymerizable compound (B), 50 parts of a methacrylic acid/methyl methacrylate/butyl methacrylate/2-ethylhexyl acrylate copolymer (copolymerization ratio: 25/50/5/20 by weight, weight-average molecular weight: 100,000) as the carboxyl-containing polymer (C), 1,600 parts of cyclohexanone as a solvent and 0 or 2 parts of sensitizer.

Each coating solution was spread on a glass sheet by a spin coater to a thickness of around 1.5 $\mu$m after dried at 60° C. for 1 minutes in an oven, and the glass sheet was exposed to light by a spectral irradiation device (JASCO's SS-25CP).

After exposure, the exposure-treated glass sheet was developed with a 1% aqueous solution of sodium carbonate, to evaluate number of insolubilized steps, and color of the film of the polymerizable composition before and after it was exposed to light. The results are given in Table 5, where the film having a larger number of the cured steps had higher sensitivity.

EXAMPLES 56 TO 70, AND COMPARATIVE EXAMPLES 51 TO 65

The homogeneous coating solutions of the polymerizable compositions given in Table 6 were prepared by 5 parts of the polymerization initiator (A), 100 parts of pentaerythritol triacrylate as the radical-polymerizable compound (B), 100 parts of poly methylmethacrylate as binder resin, 1,600 parts of cyclohexanone as a solvent and 0 or 3 parts of sensitizer.

Each coating solution was spread on a stainless steel sheet by a spin coater, and dried at 40° C. for 10 minutes in an oven. The film had a thickness of about 1.5 $\mu$m, after the solvent was removed by drying. The polymerizable composition film was coated with an aqueous solution of polyvinyl alcohol, and dried at 40° C. for 10 minutes in an oven. The dried polyvinyl alcohol film had a thickness of about 5 $\mu$m. Each sample thus prepared was analyzed for IR spectrum (reflection) of the polymerizable composition layer, while it was irradiated with light (0.3 mW/cm$^2$) from a high-pressure mercury lamp through a band pass filter selectively passing light of 350 to 380 nm, to monitor peak intensity at 810 cm$^{-1}$ at which the characteristic absorption of acrylic group appears.

Percentage of the acrylic group consumed for polymerization 20 seconds after the irradiation was determined based on the IR analysis results. Table 6 shows the percentage. The table also gives the evaluation results of color of the light-irradiated polymerizable composition films.

TABLE 5

| Example Nos. | Polymerization Initiators (A) | Sensitizers | Number of sensitized stages | Film color Before light irradiation | Film color After light irradiation |
|---|---|---|---|---|---|
| EXAMPLE 41 | Compound (1) | Not used | 13 | pale yellow | colorless |
| EXAMPLE 42 | Compound (3) | Not used | 13 | pale yellow | colorless |
| EXAMPLE 43 | Compound (4) | Not used | 13 | pale yellow | colorless |
| EXAMPLE 44 | Compound (5) | Not used | 13 | pale yellow | colorless |
| EXAMPLE 45 | Compound (6) | Not used | 13 | pale yellow | colorless |
| EXAMPLE 46 | Compound (7) | Not used | 13 | pale yellow | colorless |
| EXAMPLE 47 | Compound (8) | Not used | 13 | pale yellow | colorless |
| EXAMPLE 48 | Compound (9) | Not used | 13 | pale yellow | colorless |
| EXAMPLE 49 | Cormound (10) | Not used | 13 | pale yellow | colorless |
| EXAMPLE 50 | Compound (11) | Not used | 13 | pale yellow | colorless |
| EXAMPLE 51 | Compound (12) | Not used | 13 | pale yellow | colorless |
| EXAMPLE 52 | Compound (13) | Not used | 13 | pale yellow | colorless |
| EXAMPLE 53 | Compoound (14) | Not used | 13 | pale yellow | colorless |
| EXAMPLE 54 | Compound (15) | Not used | 13 | pale yellow | colorless |
| EXAMPLE 55 | Compound (16) | Not used | 13 | pale yellow | colorless |
| COMPARATIVE EXAMPLE 36 | Compound (26) | Not used | 5 | colorless | colorless |
| COMPARATIVE EXAMPLE 37 | Compound (27) | Not used | 6 | colorless | colorless |
| COMPARATIVE EXAMPLE 38 | Compound (28) | Not used | 6 | colorless | colorless |
| COMPARATIVE EXAMPLE 39 | Compound (29) | Not used | 4 | colorless | colorless |
| COMPARATIVE EXAMPLE 40 | Compound (30) | Not used | 6 | colorless | colorless |
| COMPARATIVE EXAMPLE 41 | Compound (31) | Not used | 0 | colorless | colorless |
| COMPARATIVE EXAMPLE 42 | Compound (32) | Not used | 9 | colorless | colorless |
| COMPARATIVE EXAMPLE 43 | Compound (33) | Not used | 8 | colorless | colorless |
| COMPARATIVE EXAMPLE 44 | Compound (34) | Not used | 9 | colorless | colorless |
| COMPARATIVE EXAMPLE 45 | Compound (35) | Not used | 0 | colorless | colorless |
| COMPARATIVE EXAMPLE 46 | Compound (36) | Not used | 8 | colorless | colorless |
| COMPARATIVE EXAMPLE 47 | Compound (31) | Compound (37) | 12 | yellow | yellow |
| COMPARATIVE EXAMPLE 48 | Compound (31) | Compound (38) | 11 | yellow | yellow |
| COMPARATIVE EXAMPLE 49 | Compound (31) | Compound (39) | 11 | yellow | yellow |
| COMPARATIVE EXAMPLE 50 | Compound (31) | Compound (40) | 11 | deep yellow | deep yellow |

TABLE 6

| Example No. | Polymerization Initiators (A) | Sensitizers | Ratio of consumed ac lyric group (%) | Film color Before light irradiation | after light irradiation |
|---|---|---|---|---|---|
| EXAMPLE 56 | Compound (1) | Not used | 21 | pale yellow | colorless |
| EXAMPLE 57 | Compound (3) | Not used | 20 | pale yellow | colorless |
| EXAMPLE 58 | Compound (4) | Not used | 22 | pale yellow | colorless |
| EXAMPLE 59 | Compound (5) | Not used | 21 | pale yellow | colorless |
| EXAMPLE 60 | Compound (6) | Not used | 22 | pale yellow | colorless |
| EXAMPLE 61 | Compound (7) | Not used | 22 | pale yellow | colorless |
| EXAMPLE 62 | Compound (8) | Not used | 22 | pale yellow | colorless |
| EXAMPLE 63 | Compound (9) | Not used | 21 | pale yellow | colorless |
| EXAMPLE 64 | Compound (10) | Not used | 18 | pale yellow | colorless |
| EXAMPLE 65 | Compound (11) | Not used | 20 | pale yellow | colorless |
| EXAMPLE 66 | Compound (12) | Not used | 19 | pale yellow | colorless |
| EXAMPLE 67 | Compound (13) | Not used | 19 | pale yellow | colorless |
| EXAMPLE 68 | Compound (14) | Not used | 18 | pale yellow | colorless |
| EXAMPLE 69 | Compound (15) | Not used | 18 | pale yellow | colorless |
| EXAMPLE 70 | Compound (16) | Not used | 22 | pale yellow | colorless |
| COMPARATIVE EXAMPLE 51 | Compound (26) | Not used | 7 | colorless | colorless |
| COMPARATIVE EXAMPLE 52 | Compound (27) | Not used | 5 | colorless | colorless |
| COMPARATIVE EXAMPLE 58 | Compound (28) | Not used | 7 | colorless | colorless |
| COMPARATIVE EXAMPLE 54 | Compound (29) | Not used | 2 | colorless | colorless |
| COMPARATIVE EXAMPLE 55 | Compound (30) | Not used | 6 | colorless | colorless |
| COMPARATIVE EXAMPLE 56 | Compound (31) | Not used | 0 | colorless | colorless |
| COMPARATIVE EXAMPLE 57 | Compound (32) | Not used | 8 | colorless | colorless |
| COMPARATIVE EXAMPLE 58 | Compound (33) | Not used | 6 | colorless | colorless |
| COMPARATIVE EXAMPLE 59 | Compound (34) | Not used | 8 | colorless | colorless |
| COMPARATIVE EXAMPLE 60 | Compound (35) | Not used | 0 | colorless | colorless |
| COMPARATIVE EXAMPLE 61 | Compound (36) | Not used | 9 | colorless | colorless |
| COMPARATIVE EXAMPLE 62 | Compound (31) | Compound (37) | 13 | yellow | yellow |
| COMPARATIVE EXAMPLE 63 | Compound (31) | Compound (38) | 14 | yellow | yellow |
| COMPARATIVE EXAMPLE 64 | Compound (31) | Compound (39) | 13 | yellow | yellow |
| COMPARATIVE EXAMPLE 65 | Compound (31) | Compound (40) | 14 | deep yellow | deep yellow |

APPLICABILITY OF INDUSTRIAL UTILIZATION

The polymerization initiator (A) for the present invention is effective for initiating polymerization of the radical-polymerizable composition (B), and the polymerizable composition composed thereof is cured to have good properties, when irradiated with light.

The polymerizable composition of the present invention is highly sensitive to irradiation light in the ultraviolet range, and can be efficiently cured when exposed to light of low energy.

Therefore, it can be used in various fields, e.g., molded resin, cast resin, sealants, polymer resin for dental purposes, resin for optical shaping, resists for printed substrates, resists for color filters, dry film resists, resists for microelectronics, photosensitive resin for printing plates, photosensitive ink jets, ink for offset, gravure and silk screen printing, color proofs for proofing prints, paints, surface coating agents, adhesives, tack agents, mold releasing agents, and hologram recording materials.

Moreover, the polymerizable composition of the present invention has greatly decreased absorption of light of the visible range, when irradiated with light, and can be suitably used for the field, represented by resists for color filters, where color-related characteristics are strictly controlled.

What is claimed is:

1. A polymerizable composition, comprising a self-sensitizing polymerization initiator (A) and a radical-polymerizable compound (B), the polymerization initiator (A) being capable of directly absorbing ultraviolet rays to substantially initiate polymerization and represented by the formula (1):

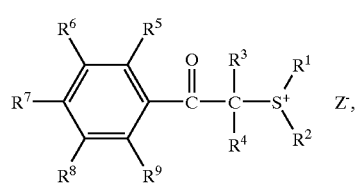

Formula (1)

wherein $R^5$, $R^6$, $R^7$, $R^8$ and $R^9$ are each independently a hydrogen atom, an alkyl, alkoxyl, hydroxyl or acyloxy group, a halogen atom, or —$NR^{10}R^{11}$ but at least one of them is —$NR^{10}R^{11}$; wherein $R^1$, $R^2$, $R^3$ and $R^4$ are each independently a hydrogen atom, or an alkyl or aryl group; and Z– is an arbitrary anion; and $R^{10}$ and $R^{11}$ are each independently an alkyl or aryl group.

2. The polymerizable composition according to claim 1, wherein said anion $Z^-$ in the formula (1) is a borate represented by the formula (2):

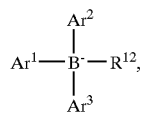

Formula (2)

wherein $Ar^1$, $Ar^2$ and $Ar^3$ are each an aryl group which may have a substituent of 6 to 10 carbon atoms; and $R^{12}$ is an aryl group which may have a substituent of 6 to 10 carbon atoms, or a primary alkyl group of 1 to 8 carbon atoms.

3. A process for producing a polymer, comprising the steps of preparing a polymerizable composition which comprises a self-sensitizing polymerization initiator (A) and a radical-polymerizable compound (B), said polymerization initiator (A) being capable of directly absorbing ultraviolet rays to substantially initiate polymerization and represented by the formula (1):

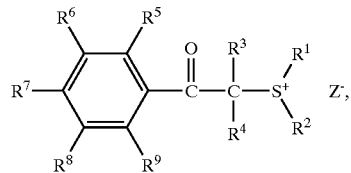

Formula (1)

wherein $R^5$, $R^6$, $R^7$, $R^8$ and $R^9$ are each independently a hydrogen atom, an alkyl, alkoxyl, hydroxyl or acyloxy group, a halogen atom, or —$NR^{10}R^{11}$, but at least one of them is —$NR^{10}R^{11}$; wherein $R^1$, $R^2$, $R^3$ and $R^4$ are each independently a hydrogen atom, or an alkyl or aryl group; $Z^-$ is an arbitrary anion and $R^{10}$ and $R^{11}$ are each independently an alkyl or aryl group; and irradiating said polymerizable composition with the ultraviolet rays.

4. A process for producing a polymer according to claim 3, wherein said anion $Z^-$ in the formula (1) is a borate represented by the formula (2):

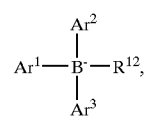

Formula (2)

wherein $Ar^1$, $Ar^2$ and $Ar^3$ are each an aryl group which may have a substituent of 6 to 10 carbon atoms; and $R^{12}$ is an aryl group which may have a substituent of 6 to 10 carbon atoms, or a primary alkyl group of 1 to 8 carbon atoms.

\* \* \* \* \*